(12) United States Patent
Schulze

(10) Patent No.: US 7,665,938 B2
(45) Date of Patent: Feb. 23, 2010

(54) COAXIALLY MOUNTED RETRACTING GUIDE AND RESTRAINT FOR AN AIR CARGO SYSTEM

(75) Inventor: Gregory James Schulze, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 81 days.

(21) Appl. No.: 11/393,625

(22) Filed: Mar. 30, 2006

(65) Prior Publication Data

US 2007/0237598 A1    Oct. 11, 2007

(51) Int. Cl.
B60P 7/08    (2006.01)
(52) U.S. Cl. .............. 410/80; 410/77; 410/92
(58) Field of Classification Search .......... 410/69, 410/77, 80, 94, 95, 92, 78; 414/536; 244/118.1, 244/137.1; 248/500, 503
See application file for complete search history.

(56) References Cited

U.S. PATENT DOCUMENTS

| | | | |
|---|---|---|---|
| 3,693,920 A | | 9/1972 | Trautman |
| 4,234,278 A | * | 11/1980 | Harshman et al. ............. 410/69 |
| 5,011,348 A | | 4/1991 | Jensen et al. |
| 5,265,991 A | | 11/1993 | Herrick et al. |
| 5,356,250 A | | 10/1994 | Vogg et al. |
| 5,486,077 A | | 1/1996 | Nutting |
| 5,564,654 A | | 10/1996 | Nordstrom |
| 5,816,758 A | | 10/1998 | Huber |
| 5,957,406 A | | 9/1999 | Nelson et al. |
| 6,270,300 B1 | | 8/2001 | Huber et al. |
| 6,450,744 B1 | | 9/2002 | Gilhuys et al. |
| 6,485,238 B2 | | 11/2002 | Segura |
| 6,729,818 B1 | | 5/2004 | Yee et al. |
| 6,736,585 B2 | * | 5/2004 | O'Daniel |
| 6,926,481 B2 | | 8/2005 | Huber |
| 2003/0156914 A1 | | 8/2003 | Huber |
| 2007/0095978 A1 | | 5/2007 | Oetken et al. |

OTHER PUBLICATIONS

German office action mailed Dec. 17, 2008, application No. 10 2007 015 285.1-22, English abstract attached.

* cited by examiner

*Primary Examiner*—Stephen Gordon
(74) *Attorney, Agent, or Firm*—Womble Carlyle

(57) ABSTRACT

An air cargo device for facilitating the movement and retention of unit load devices on an air cargo deck includes a base member on which are mounted a caster roller, a guide and a restraint. The guide and the restraint are coaxially mounted and together occupy one of three positions: both the guide and restraint being recessed; the guide raised with the restraint recessed, and both the guide and restraint being raised. One end of the base member is provided with retractable tension studs suitable for mating with a portion of a seat track, while the opposite end of the base member is provided with shoulder bolts for mating with a lock tray. This permits the device to bridge between the two types of cargo floor fixtures.

23 Claims, 23 Drawing Sheets

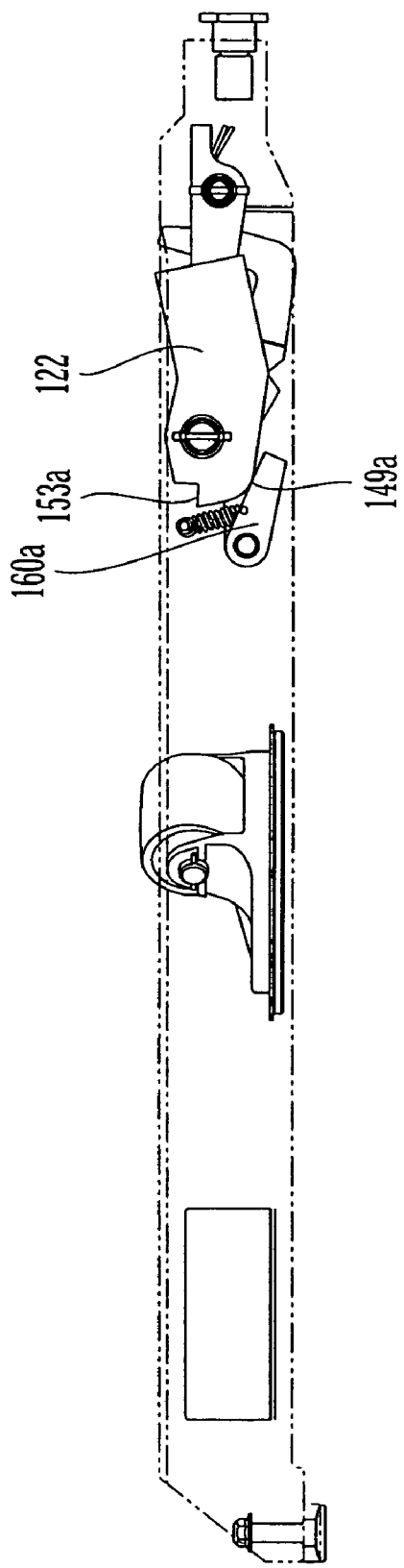
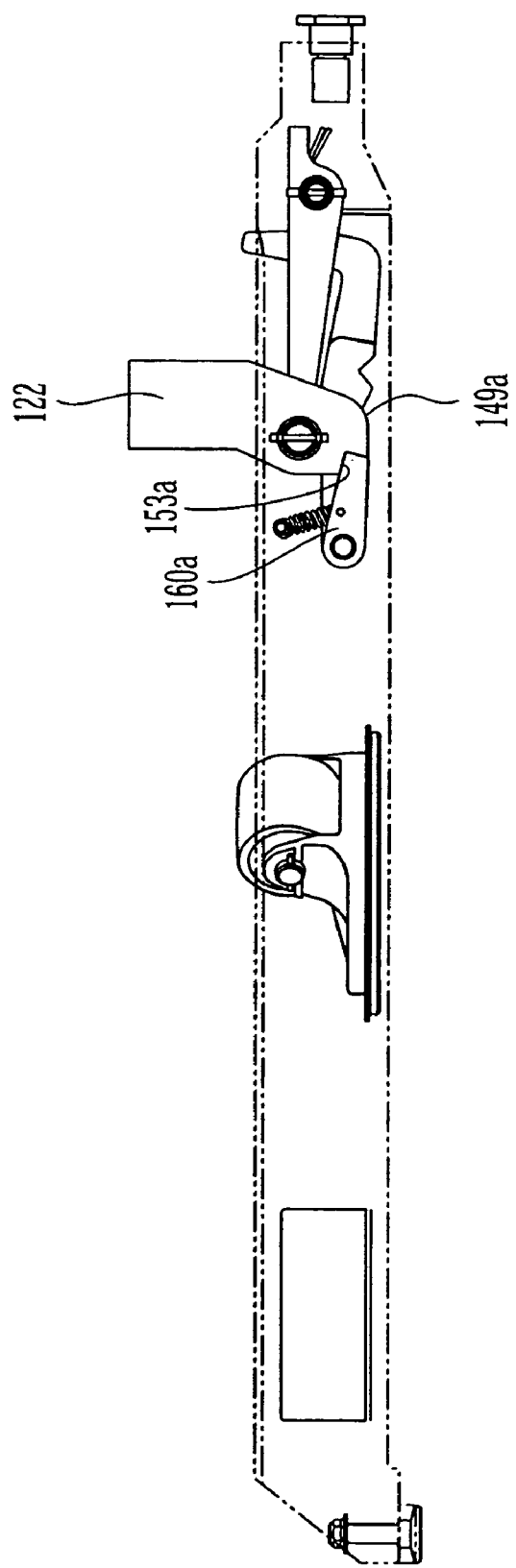

COAXIALLY MOUNTED RETRACTING GUIDE AND RESTRAINT FOR AN AIR CARGO SYSTEM

CROSS REFERENCE TO RELATED APPLICATIONS

None.

BACKGROUND OF THE INVENTION

1. Field of the Invention

The present invention is related to a guide and restraint assembly suitable for retaining centerline-mounted air cargo loading unit load devices, such as pallets.

2. Background

Commercial aircraft carry cargo in containers and pallets, referred to collectively as unit load devices (ULDs). ULDs are available in several different standard configurations with different lengths and widths. During loading and unloading operations, ULDs must be guided within the cargo compartment. During flight, ULDs must be retained to prevent damage to the aircraft and the cargo. Floor-mounted devices, such as guides and restraints are typically used for these purposes and some such devices (referred to herein as a "guide/restraint") serve both functions.

The deck of a Boeing 747 main cargo compartment is configured with a multitude of longitudinally extending retaining devices such as seat tracks (sometimes referred to as "seat rails") and lock trays to which such guides, restraints and guide/restraints (collectively, "conveying devices") are attached. A number of these retaining devices and conveying devices are positioned to accommodate some containers in predetermined locations in a side-by-side configuration along the centerline of the 747 main cargo deck.

From time to time, a 747 main cargo compartment must carry out-sized cargo (i.e., cargo that does not fit in standard positions because it would interfere with the inside contour of a cargo hold). An example of out-sized cargo might be a large turbine engine which, due to its large width and circular profile, cannot be loaded in a standard location close to the cargo hold sidewall. In such case, the out-sized cargo is loaded onto a standard-size pallet which in then placed along the centerline of the cargo hold. Currently, standard-sized pallets for air cargo transport are approximately 96 inches wide and either 20 feet, 16 feet or 10 feet in length. Mounting such a pallet along the centerline results in the long sides of a pallet extending about 48 inches on either side of the centerline.

Currently, the 747 cargo deck is not equipped with guide/restraints that are suitable for both guiding containers and retaining centerline mounted pallets. As a result, on a 747 main cargo deck, a centerline loaded pallet is normally tied down using straps. This method of restraining the pallet requires a large amount of manpower, requiring a number of personnel trained to properly strap cargo securely. It also delays the unloading of the such cargo, due to the time it takes to safely remove the straps at the destination.

SUMMARY OF THE INVENTION

In one aspect, the present invention is directed to an air cargo transportation device capable of both guiding and restraining ULDs. The device includes a base having a first end and a second end, a first guide mounted to the base and rotatable between a retracted position and an upright position, and a lockhead mounted to the base and rotatable between a retracted position and an upright position, wherein the first guide and the lockhead are coaxially arranged.

The first end of the base is provided with tension studs suitable for engaging a seat track and also with shear bosses suitable for engaging a seat track. The shear bosses may be located outside a load span defined by the tension studs.

The second end of the base may be provided with bolts for engaging a lock tray.

A caster may be mounted to the base between the first and second ends.

The first guide and the lockhead may be coaxially mounted on a common shaft that is proximate the second end of the base.

The device may be arranged such that, when the lockhead is in the retracted position, the lockhead can be rotated from the retracted position to the upright position only (a) if the first guide is also rotated from the retracted position to the upright position at the same time, or (b) if the first guide is already in the upright position.

A rotatably mounted pawl having a pair of spaced apart legs may be used to maintain the lockhead in the upright position, the spaced apart legs abutting the lockhead.

A pair of spaced apart guide pawls fixedly mounted on a shaft may be used to engage a lower portion of the first guide and maintain it in the upright position. The shaft may also include a release handle mounted thereon which, when activated, releases the lower portion of the first guide and allows the first guide to return to the retracted position.

Furthermore, when both the first guide and the lockhead are in the upright position, the lockhead is taller than the first guide and projects in a first direction towards the first end of the base, past the forwardmost point of the first guide extending in said first direction.

The air cargo transportation device may further comprise a second guide mounted to the base and rotatable between a retracted position and an upright position, the first guide and second guide both being mounted proximate the second end of the base.

In another aspect, the present invention is directed to an air cargo deck configured to restrain a pallet along its centerline. The air cargo deck has first and second rows of air cargo transportation devices mounted therein, the first and second rows extending parallel to, and on opposite sides of, the centerline, each row comprising a plurality of air cargo transportation devices. Each such air cargo transportation device comprises a base having a first end and a second end, a first guide mounted to the base and rotatable between a retracted position and an upright position, and a lockhead mounted to the base and rotatable between a retracted position and an upright position, wherein the first guide and the lockhead are coaxially arranged. The air cargo transportation devices are mounted in the cargo deck such that the first end of each base is closer to the centerline than the second end of that base, the first end of each air cargo transportation device is attached to a seat track, and the second end of each air cargo transportation device is attached to a lock tray. The first guide and the lockhead may be proximate to the second end.

In yet another aspect, the present invention is directed to a method of loading a pallet on an air cargo deck having a centerline. The method entails providing the air cargo deck arranged as described above, positioning the pallet such that it straddles the centerline with long sides of the pallet overlying a portion of the base of at least some of said air cargo transportation devices in each row, and then rotating the lockheads of said at least some of said air cargo transportation devices in each row from the retracted position to the upright position, to thereby retain the pallet in position. Prior to positioning the pallet, one or more items of out-sized cargo may be placed on the pallet.

In still another aspect, the present invention is directed to a method of converting an air cargo deck so that it can accommodate centerline loading of a pallet without the use of straps. In this instance, the air cargo deck already has first and second seat tracks extending parallel to the centerline and positioned on either side thereof, and also first and second lock trays extending parallel to the centerline and positioned on either side thereof. Each of the first and second lock trays is spaced apart from a corresponding seat track and is farther from the centerline that its corresponding seat track. The inventive method comprises installing a first plurality of air cargo transportation devices between the first seat track and the first lock tray, and installing a second plurality of air cargo transportation devices between the second seat track and the second lock tray. Each such installed air cargo transportation device comprises a base having a first end and a second end, a first guide mounted to the base and rotatable between a retracted position and an upright position, and a lockhead mounted to the base and rotatable between a retracted position and an upright position, wherein the first guide and the lockhead are coaxially arranged. The first guide and the lockhead may be proximate to the second end of the base.

BRIEF DESCRIPTION OF THE DRAWINGS

FIG. 13 shows a side view of the embodiment of FIG. 8.

FIG. 14 shows a side view of the embodiment of FIG. 10.

DETAILED DESCRIPTION OF THE INVENTION

Figure 1:
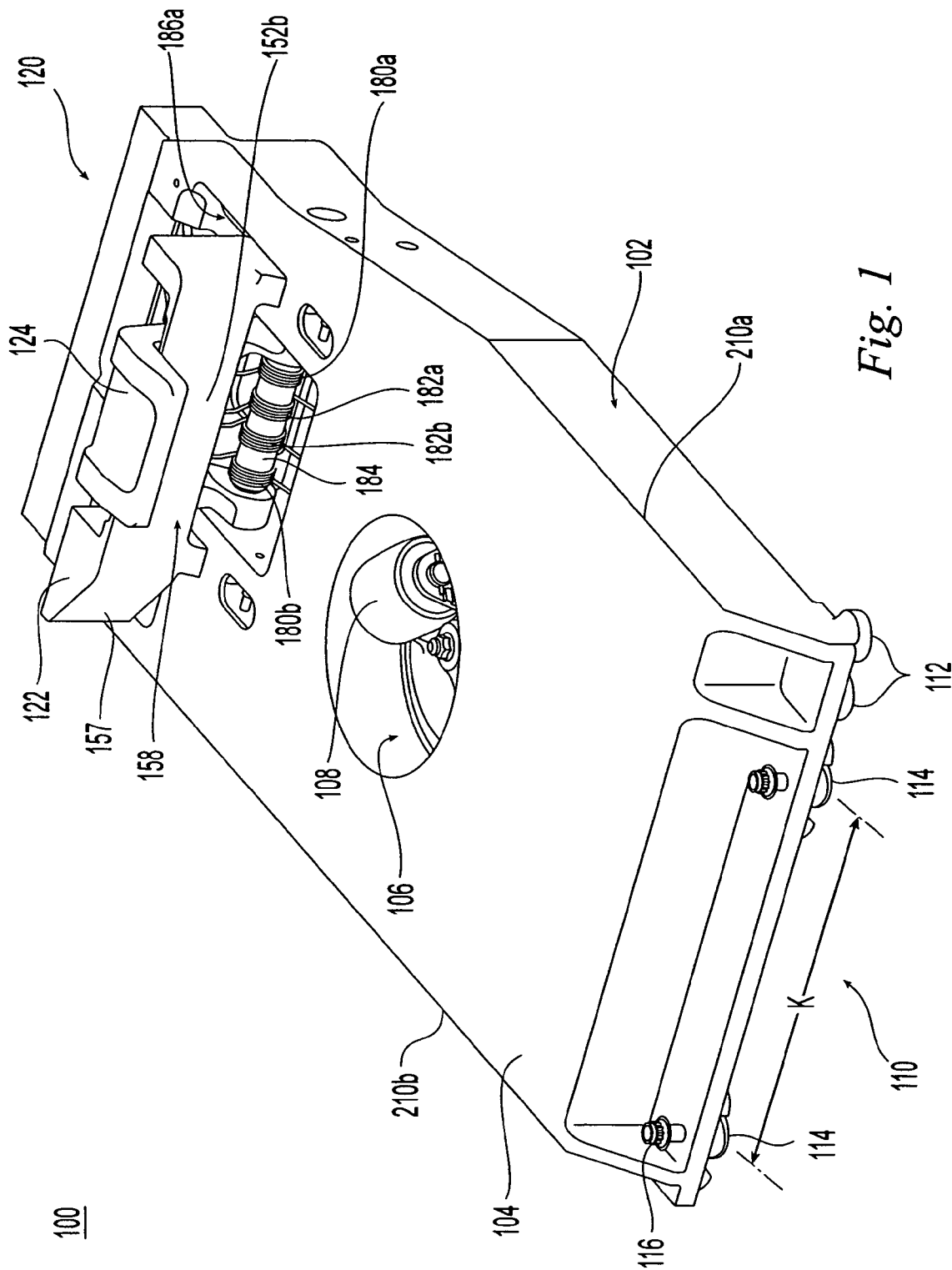
FIG. 1 shows a front perspective view of a first embodiment of a guide/restraint in accordance with the present invention, with the guide and lockhead both in the upright position.

FIG. 1 shows a perspective view of a guide/restraint 100 in accordance with a first embodiment of the present invention with both the rotatable guide 122 and the rotatable lockhead 124 in the upright position. As seen in the rear perspective view of FIG. 2, a rotatable U-shaped lockhead pawl 126 supports the lockhead 124.

Figure 2:
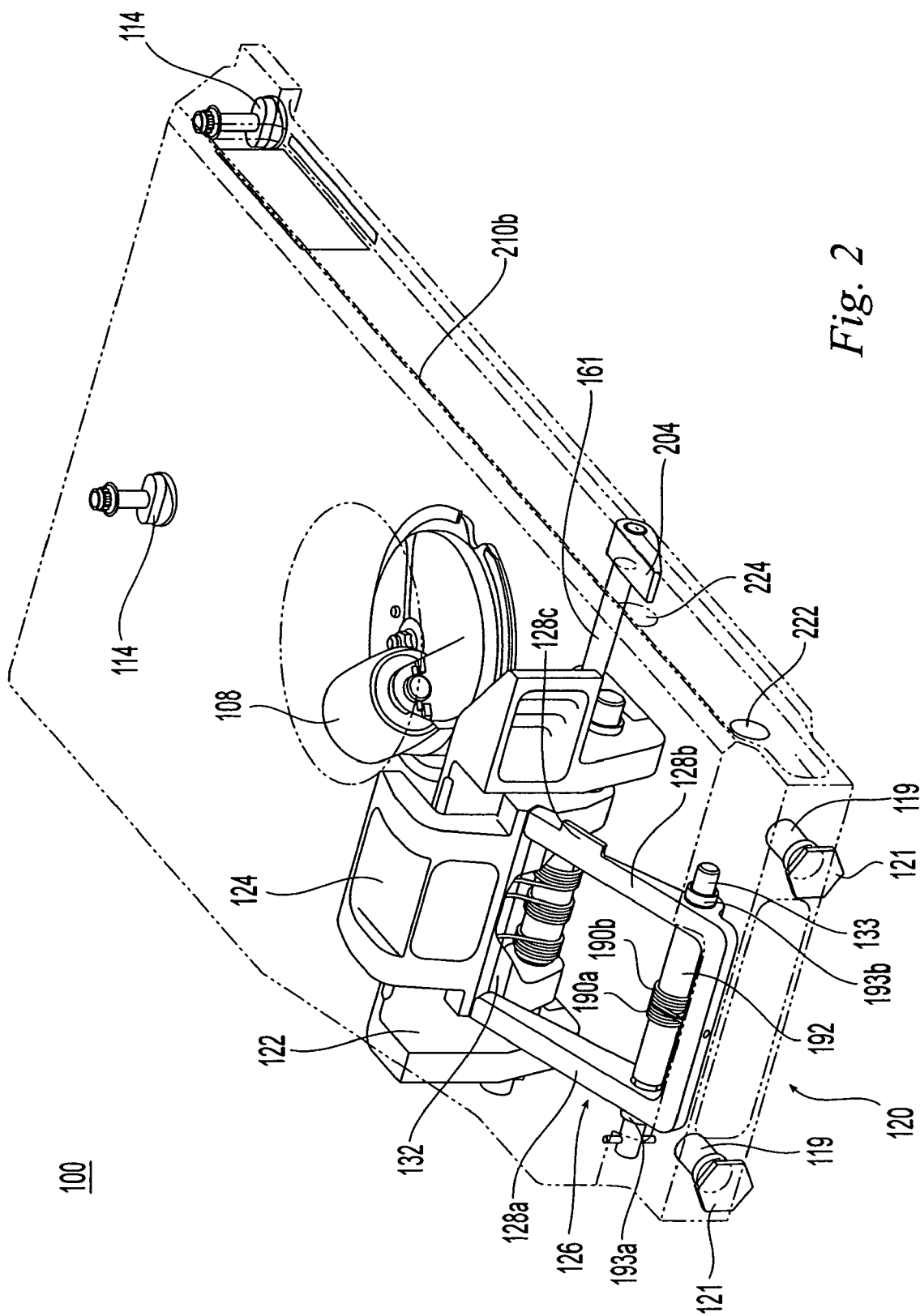
FIG. 2 shows a rear perspective view the guide/restraint of FIG. 1 with the base seen in phantom.
Figure 3A:
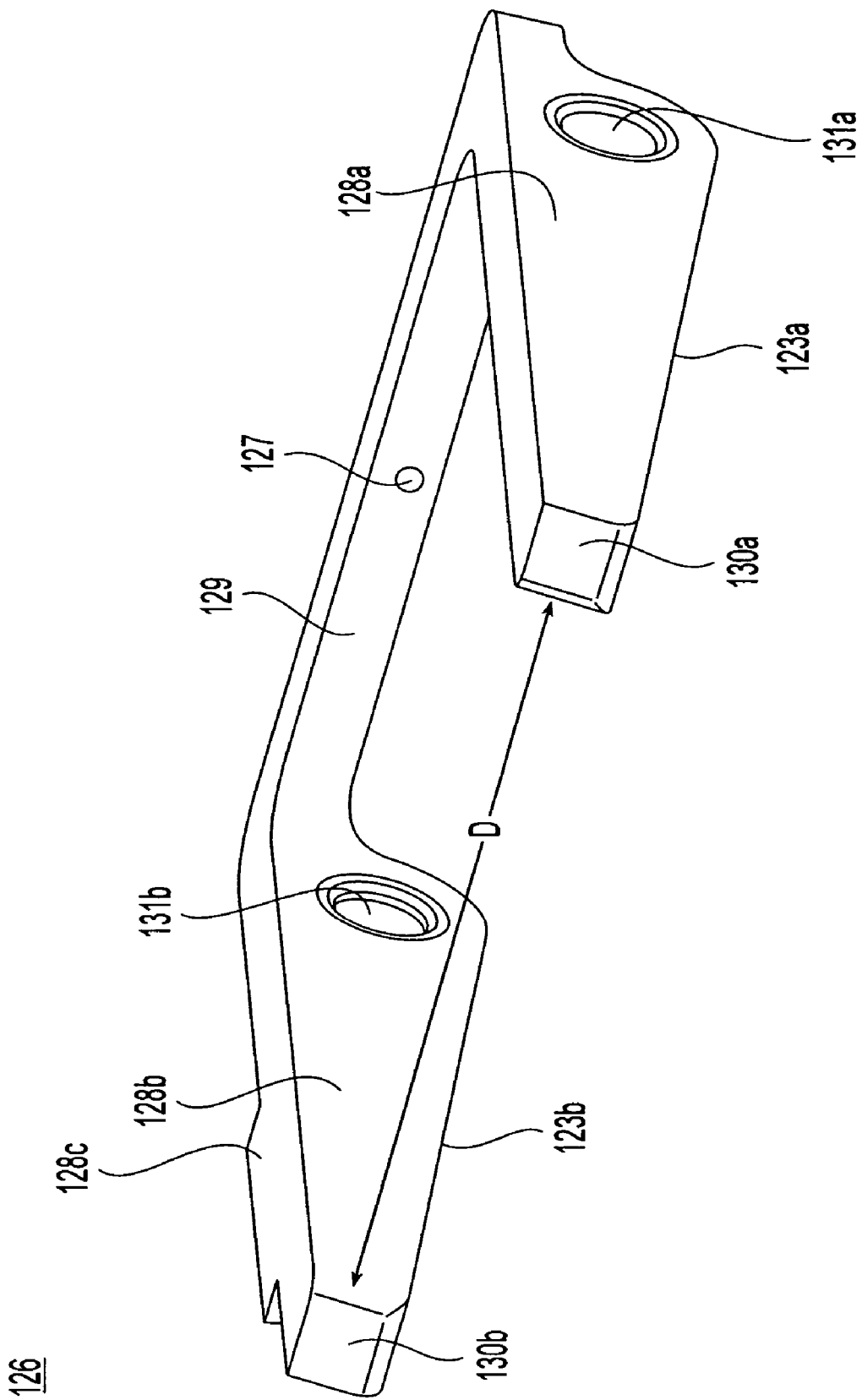
FIG. 3A show a U-shaped pawl configured to support the rotated lockhead in the upright position
Figure 3B:
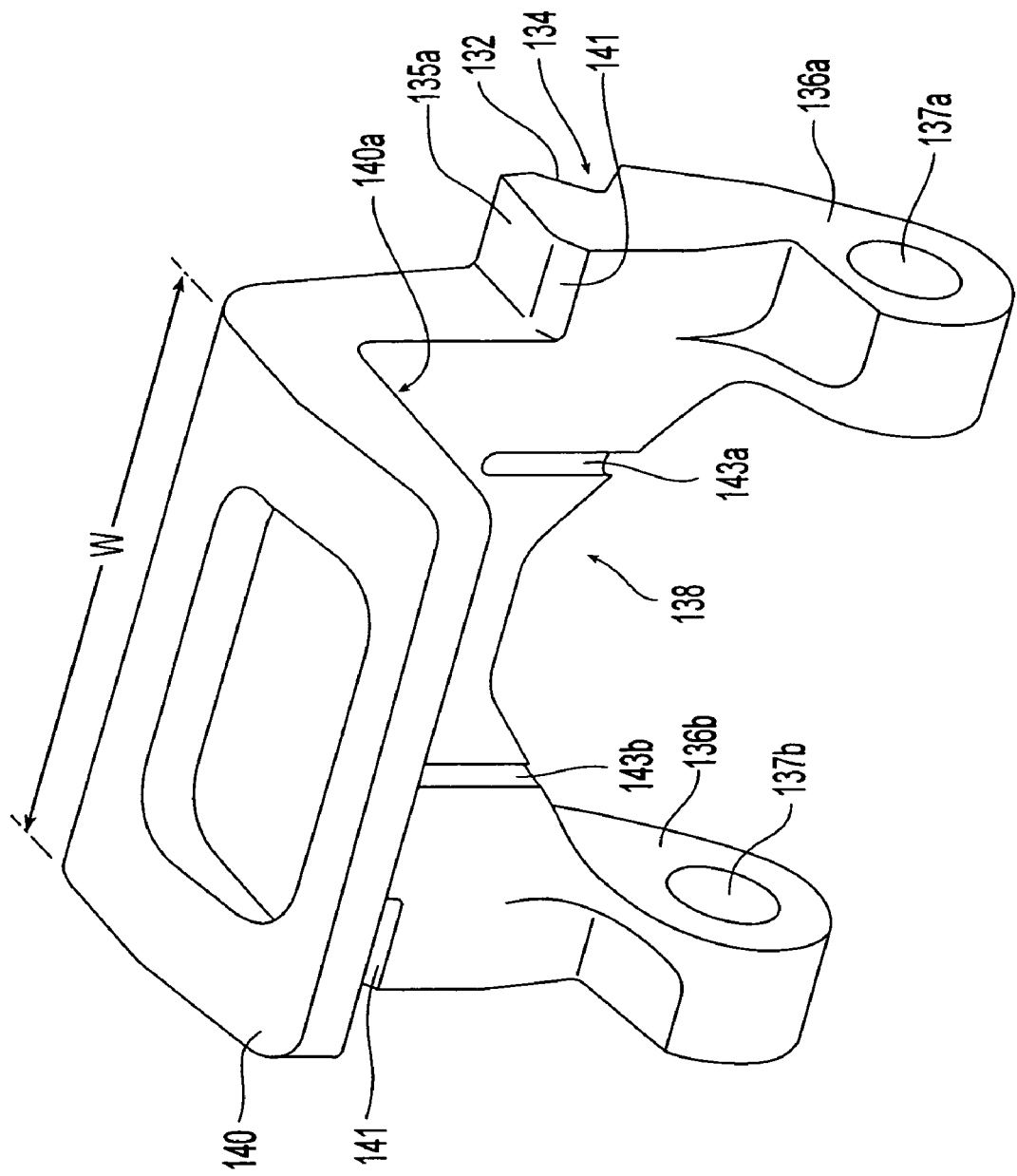
FIG. 3B shows a rotatable lockhead which serves as the restraint member.
Figure 5A:
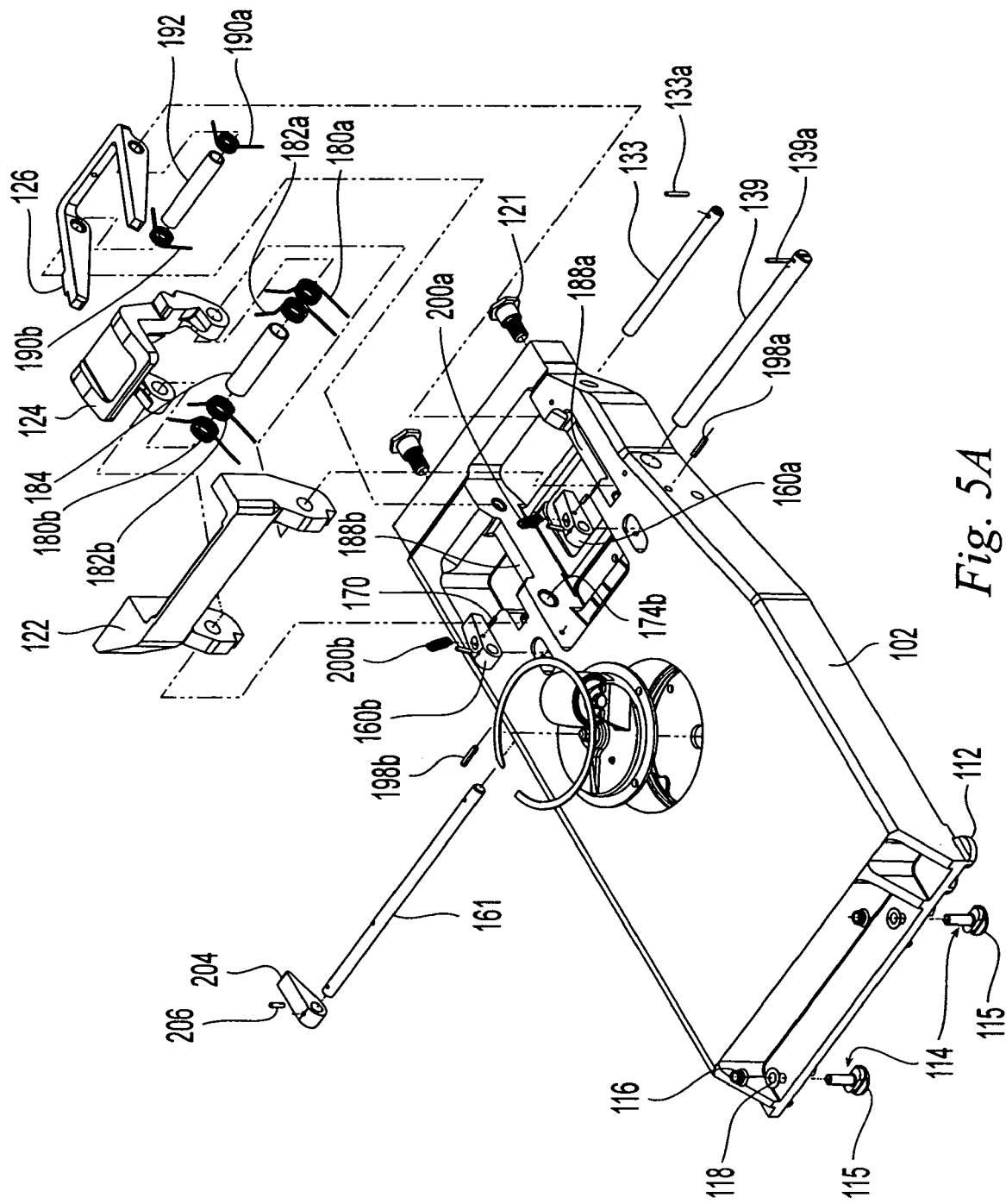
FIG. 5A shows a first exploded view illustrating the assembly of the guide/restraint of FIG. 1.

As seen in FIG. 3A, the U-shaped lockhead pawl 126 has a pair of pawl legs 128A, 128B which are spaced apart at their inner surfaces by a distance D. The legs 128A, 128B are connected by a cross member 129 having an aperture 127 for receiving ends of lockhead pawl torsions springs 190A, 190B (FIG. 2). Each pawl leg 128A, 128B is provided with a corresponding opening 131A, 131B for rotatably mounting the lockhead pawl 126 on a lockhead pawl shaft 133 (FIG. 5A). The pawl legs 128A, 128B have lower ramping surfaces 123A, 123B, respectively, whose significance is described below with respect to operation of the lockhead 124 and FIGS. 11 and 12. Furthermore, the ends 130A, 130B of the pawl legs 128A, 128B, respectively, serve as abutment surfaces which abut against rearwardly facing surfaces 132 formed in a notch 134 of the lockhead 124 (FIG. 3B). It is these ends 130A, 130B which support the lockhead 124 when the latter is in the upright position of FIGS. 1 and 2. A flange 128C on the side of one leg 128B provides a handle of sorts to facilitate hand or foot operation of the lockhead pawl 126.

As seen in FIG. 3B, the lockhead 124 includes a pair of spaced apart lockhead legs 136A, 136B in which a pair of openings 137A, 137B, respectively, are formed. The openings 137A, 137B permit the lockhead 124 to be rotatably mounted on a lockhead shaft 139 (FIG. 5A). The lockhead's spaced apart legs 136A, 136B are connected by an upper lockhead body 138 terminating in a forwardly projecting lock 140. It is the underside surface 140A of the lock 140 which, when deployed during flight, is juxtaposed against a lip or other formation on an ULD, thereby retaining such ULD in place. The transverse width W of the lock 140 is narrower than spacing D between the legs 128A, 128B of the lockhead pawl 122. Upper portions of the lockhead's legs 136A, 136B are provided with shoulders 135A, 135B (only one being shown in FIG. 3B). As seen in FIG. 3B, the shoulders 135A, 135B each are provided with a beveled surface 141 proximate the front side of the lockhead body 138. The lower portion of the body 138, on a front side thereof, is provided with a pair of channels 143A, 143B configured to accommodate ends of outer torsion springs 180A, 180B, which bias the lockhead 124 towards the retracted (down) position.

Figure 3C:
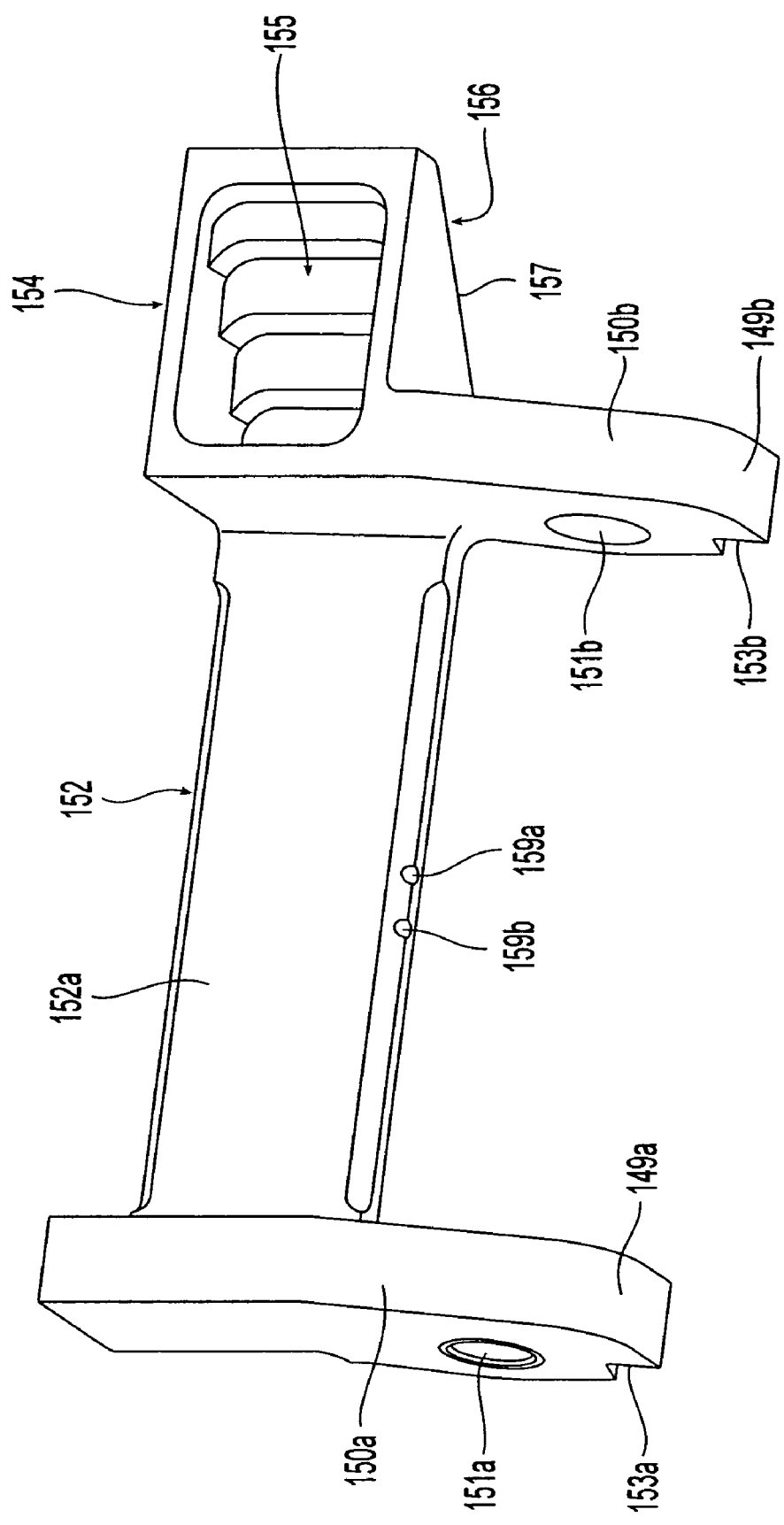
FIG. 3C shows a rotatable guide member which serves as the main guide.

As seen in FIG. 3C, the rotatable guide 122 has a pair of spaced apart guide legs 150A, 150B connected by a guide cross member 152 having a backside 152A and a front side 152B (FIG. 1). The lower portion of the guide cross member 152 is provided with a pair of apertures 159A, 159B into which ends of inner torsion springs 182A, 182B are inserted to bias the guide 122 towards the retracted (down) position. Thus, both the guide 122 and the lockhead 124 are normally biased toward the retracted position in which they recline in the recesses 170, 172, described below.

The guide legs 150A, 150B are provided with openings 151A, 151B, respectively, which permit the guide 122 to be rotatably mounted on the lockhead shaft 139 (FIG. 5A). Thus, the guide 122 and the lockhead 124 are coaxially arranged and, in the embodiment shown, are mounted on and share the common lockhead shaft 139. The lockhead legs 136A, 136B are spaced apart by a first distance that is smaller than a second distance between the guide legs 150A, 150B. Accordingly, in the guide/restraint 100, the lockhead legs 136A, 136B are nested between the guide legs 150A, 150B along the lockhead shaft 139. Thus, the guide 122 and the lockhead 124 are separate members having dissimilar shapes and sharing a common axis of rotation around which each is rotatable relative to the base 102.

At their lowermost portion, the guide legs 150A, 150B are provided with forwardly facing cutouts 153A, 153B, respectively. As discussed further below, when the rotatable guide 122 is the upright position, the cutouts 153A, 153B are engaged by spaced apart, upwardly biased guide pawls 160A, 160B (FIGS. 6, 10 & 14), respectively, which are mounted on a guide pawl shaft 161 and secured thereto by guide pawl shaft pins 163. The lower portions of the guide legs 150A, 150B, on their back sides, are provided with curved abutment surfaces 149A, 149B, respectively. As discussed further below with respect to FIG. 8, these abutment surfaces 149A, 149B abut and move along riding surfaces of the upwardly biased guide pawls 160A, 160B, when the guide 122 is adjusted from the retracted position to the upright position.

Attached to an upper portion of guide leg 150B is an outwardly extending, wedge-shaped guide head 154. The guide head 154 has a rearwardly facing hollow back side 155 and a rearwardly beveled front side 157. The forwardly facing front side 152B of the cross member 152, and the rearwardly beveled front side 157 of the guide head 156 together form a continuous guide abutment surface 158 for guiding ULDs, when the guide head 156 is in the upright position (FIG. 1).

Figure 4:
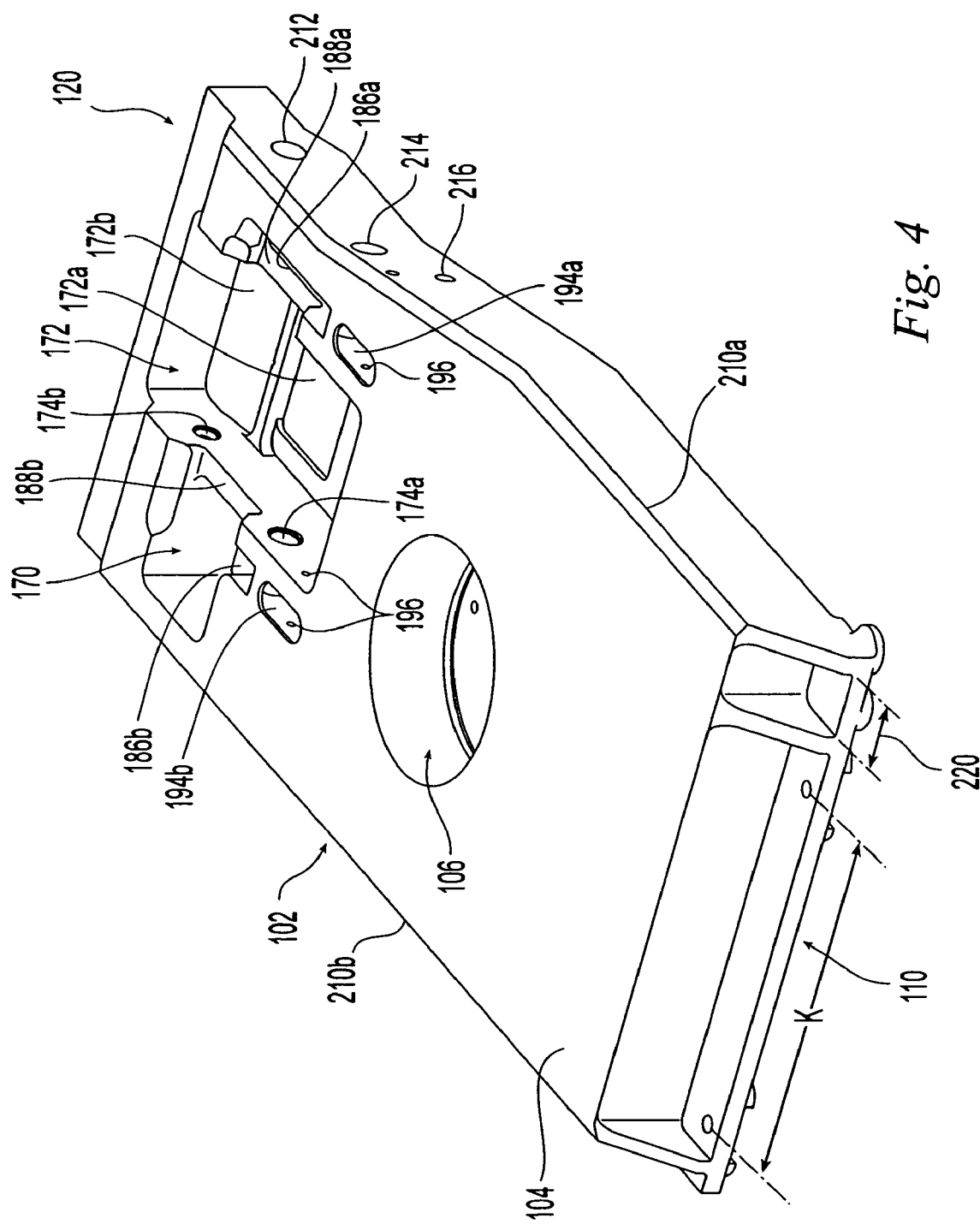
FIG. 4 shows the base of the guide/restraint of FIG. 1.

As seen in FIGS. 1 and 4, the guide/restraint 100 includes a base 102 having a top surface 104. Formed in the top surface 104 of the base 102 is a circular recess 106 for accommodating a roller-type caster 108. The caster 108 is positioned between the guide 122 and a first, or 'inboard' end 110 of the base 102. The caster 108 is itself mounted on a swiveling base, allowing it to pivot and self-align with an ULD passing overhead. The caster 108 provides vertical support for a bottom of a passing ULD to help eliminate sagging ULD edges.

The first or 'inboard' end 110 of the base 102, at lower portion thereof, is provided with integrally formed shear bosses 112 and spring biased tension studs 114 having an elongated lower portion 115 (FIG. 5A). The shear bosses 112 and the tension studs 114 are configured to engage a seat track 410, as discussed further below. Tension stud nuts 116 and washers 118 (FIGS. 5A & 5B) maintain the tension studs 114 in place. The tension studs 114 are spaced apart by a distance K, and define the transverse extent of the guide/restraint's load span.

As seen in FIG. 2, the second or 'outboard' end 120 of the base 102 is provided with openings 119 into which removable shoulder bolts 121 may be inserted, for securely attaching the guide/restraint 100 to a lock tray, as discussed further below. Thus, in this embodiment, opposite ends 110, 120 of the base 102 are provided with different types of fixation devices 114, 121 for attaching to dissimilar retaining devices mounted on an air cargo deck.

As seen in the embodiment of FIG. 4, the axially extending long sides 210A, 210B of the base are not parallel to one another, although this is not a requirement of the present invention. In the embodiment shown, one side 210A is provided with a gusset 220 which widens a portion of the base proximate the inboard end 110 where the shear bosses 112 are located. Providing such a gusset 220 helps distribute a vertical load applied to the guide/restraint 100 via shear bosses 112. The shear bosses 112 are outside the load span K (FIG. 1) defined by the spacing between tension studs 114, and so a vertical load may be directed to positions outside the normal load span K.

Again with reference to FIG. 4, the top surface 104 of the base 102 also includes a pair of recesses 170, 172 proximate the outboard end 120. Of these, recess 172 has a forward recess portion 172A and a rearward recess portion 172B.

Figure 7:
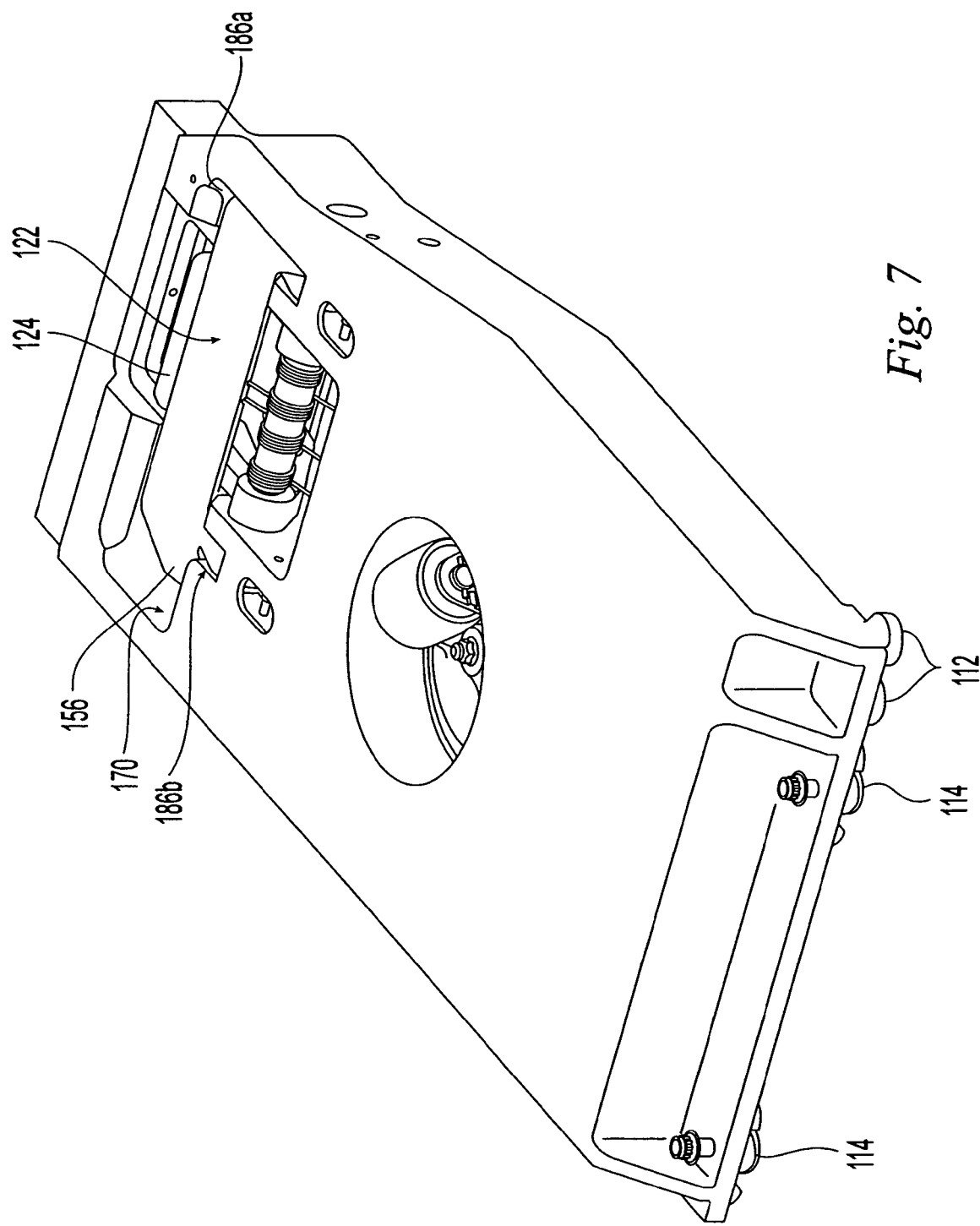
FIG. 7. shows a front perspective view of the embodiment of FIG. 1, with the guide and lockhead both in the retracted position.

As seen in FIG. 7, recess 170 is configured to receive the wedge-shaped guide head 156, when the guide 122 is in the retracted position.

With reference to FIGS. 4, 5A, 5B and 6, the forward recess portion 172A accommodates the lockhead legs 136A, 136B (best seen in FIG. 3B), the lockhead shaft 139, and a lockhead sleeve 184 mounted on the lockhead shaft 139. The forward recess portion 172A also accommodates two pairs of torsion springs which are mounted on the lockhead sleeve 184. The two pairs of torsion springs include a first inner pair 182A, 182B configured to bias the guide 122 towards the retracted position, and a second outer pair 180A, 180B configured to bias the lockhead 124, also towards the retracted position.

In the embodiment shown, the guide legs 150A, 150B (FIG. 3C) are accommodated in narrow slots 186A, 186B located on either side of the forward recess portion 172A and separated therefrom by intermediate recess walls 188A, 188B, respectively. Slot 186B communicates with guide head recess 170. As seen in FIG. 4, the forward recess portion 172A, on a first sidewall thereof, has a forward journalled opening 174A for supporting the lockhead shaft 139. The opposing second sidewall (hidden in FIG. 4) of the forward recess portion 172A has a similar forward journalled opening (also hidden in FIG. 4).

A first pair of bushings 183A, 183B are positioned in the lockhead leg openings 137A, 137B, respectively, to facilitate rotation of the lockhead 124. Meanwhile, a second pair of bushings 185A, 185B are positioned in the guide openings 151A, 151B, respectively, to facilitate rotation of the guide 122. A lockhead shaft securing pin 139A is used to ensure that the lockhead shaft 139 stays in place.

Figure 5B:
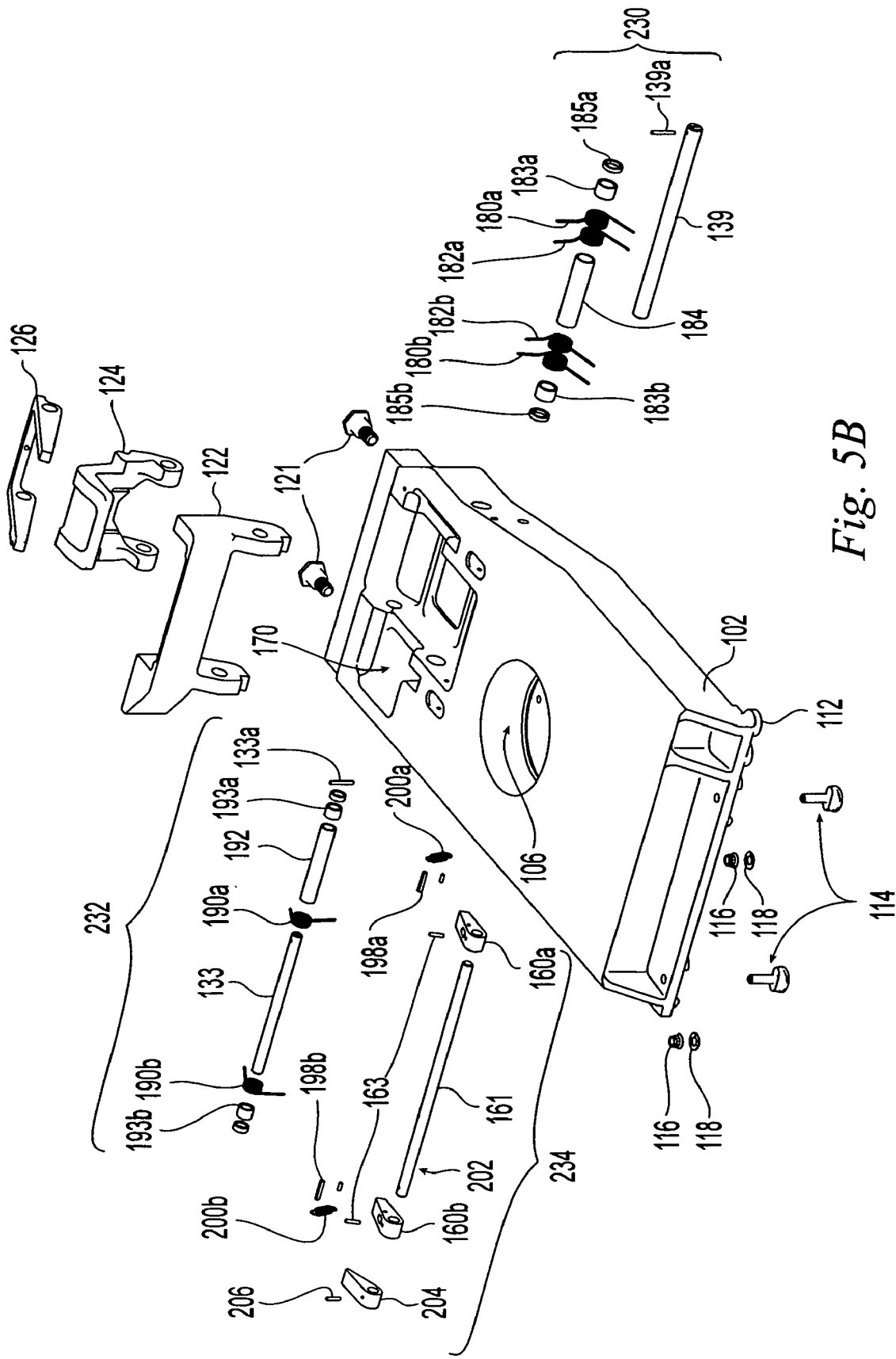
FIG. 5B shows a second exploded view illustrating clusters of components belonging to shaft and pin assemblies around which the guide, the lockhead, the lockhead pawl and the guide pawls rotate.

The lockhead shaft 139, the lockhead shaft securing pin 139A, the lockhead sleeve 184, the inner and outer pairs of torsion springs 182A, 182B and 180A, 180B, respectively, and the first and second pairs of bushings 183A, 183B and 185A, 185B, respectively, together form a lockhead shaft assembly 230 (FIG. 5B).

Again with reference to FIGS. 4, 5A and 6, the rearward recess portion 172B accommodates the pawl legs 128A, 128B, the lockhead pawl shaft 133, and a lockhead pawl sleeve 192 mounted on the lockhead pawl shaft 133. The rearward recess portion 172B also accommodates a pair of lockhead torsion springs 190A, 190B which are mounted on the lockhead pawl sleeve 192, and downwardly biases the lockhead pawl 126. As seen in FIG. 4, the rearward recess portion 172B, on a first sidewall thereof, has a rearward journalled opening 174B for supporting the lockhead pawl shaft 133. The opposing second sidewall (hidden in FIG. 4) of the forward recess portion 172A has a similar forward journalled opening (also hidden in FIG. 4).

A pair of bushings 193A, 193B (FIG. 5B) are positioned in the lockhead pawl openings 131A, 131B (FIG. 3A), respectively, to facilitate rotation of the lockhead pawl 126 around the lockhead pawl shaft 133. A lockhead pawl shaft securing pin 133A is used to ensure that the lockhead pawl shaft 133 stays in place.

The lockhead pawl shaft 133, the lockhead pawl shaft securing pin 133A, the lockhead pawl sleeve 192, the lockhead torsion springs 190A, 190B, and the bushings 193A, 193B together form a lockhead pawl shaft assembly 232 (FIG. 5B).

As best seen in FIG. 4, the top surface 104 of the base 102 is also provided with a pair of openings 194A, 194B for receiving the guide pawls 160A, 160B which, as stated above, are mounted on the guide pawl shaft 161. The sidewalls within each of the openings 194A, 194B are provided with pairs of opposing apertures 196 for supporting horizontally aligned tension spring pins 198A, 198B. The tension spring pins 198A, 198B, in turn, each support one end of a tension spring 200A, 200B, respectively. The second ends of the tension springs 200A, 200B are anchored in an aperture (FIG. 6) formed within the guide pawls 160A, 160B, respectively.

The axis of the guide pawl shaft 161 is offset relative to the axes of the directions in which the guide pawls 160A, 160B are upwardly biased. Therefore, the tension springs 200A, 200B urge the guide pawl shaft 161 to rotate in the direction indicated by the rotational arrow R, as shown in FIG. 6.

Figure 6:
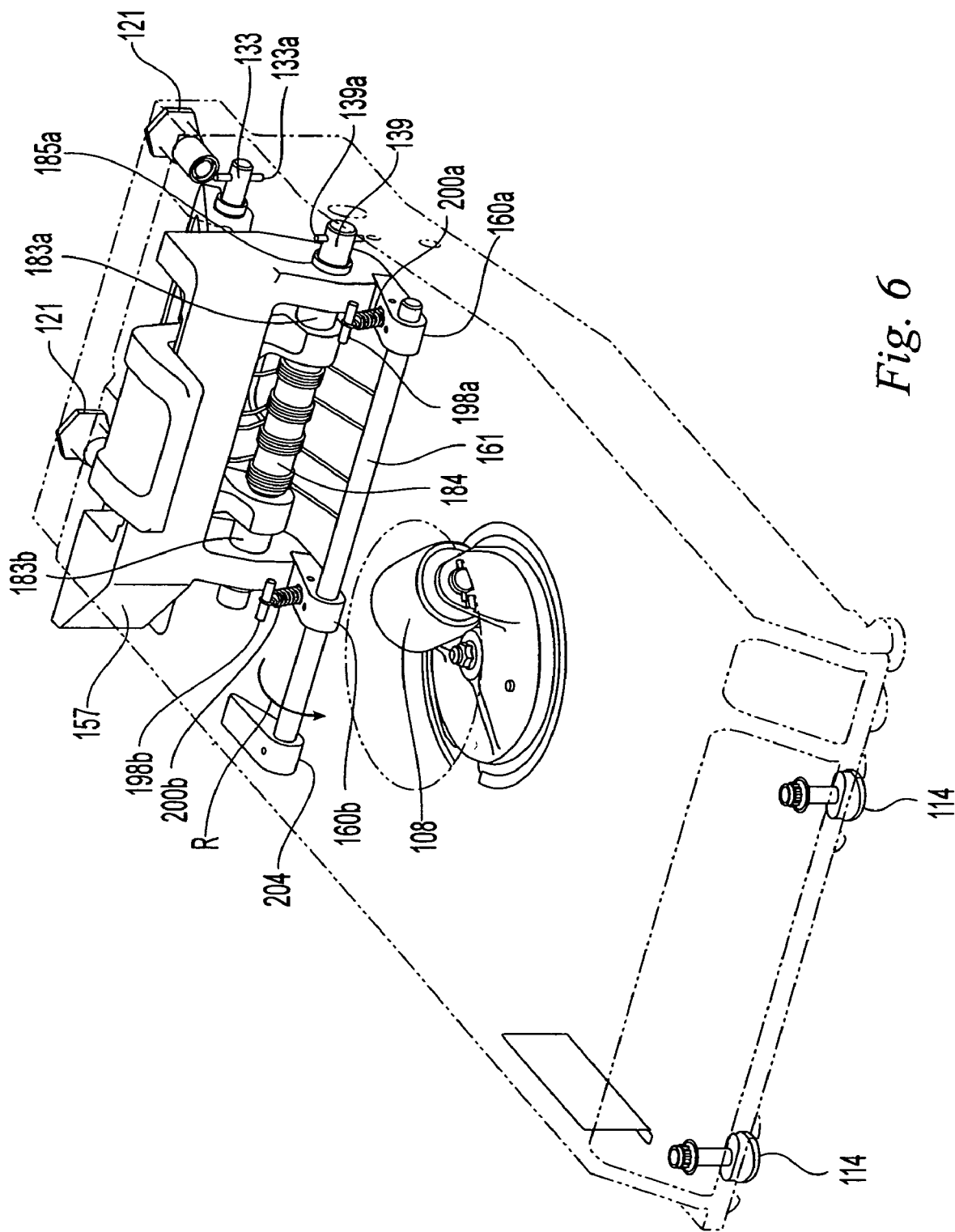
FIG. 6 shows a view of FIG. 1 with the base seen in phantom.

As seen in FIGS. 2 and 6, a first end 202 of the guide pawl shaft 161 is provided with a manually operable release handle 204. The release handle 204 is secured to the guide pawl shaft 161 via a release handle pin 206. The guide pawl shaft 161, the release handle 204, the guide pawls 160A, 160B, the tension springs 200A, 200B, and the various pins associated with each of these, together form a guide pawl shaft assembly 234 (FIG. 5B).

As best seen in FIG. 4, a long side 210A of the base 102 is provided with a number of apertures 212, 214 and 216. Aperture 212, which has a mate 222 on the opposite long side 2101B of the base 102 (FIG. 2), permits the insertion of the lockhead pawl shaft 133 and other members of the lockhead pawl shaft assembly 232. Aperture 214, which also has a mate 224 on the opposite long side 210B of the base 102 (FIG. 2), permits the insertion of the lockhead shaft 139 and other members of the lockhead shaft assembly 230 (FIG. 5B). Lastly, aperture 216, which also has a mate (not seen) on the opposite long side 210B of the base 102, permits the insertion of the guide pawl shaft 161.

Figure 8:
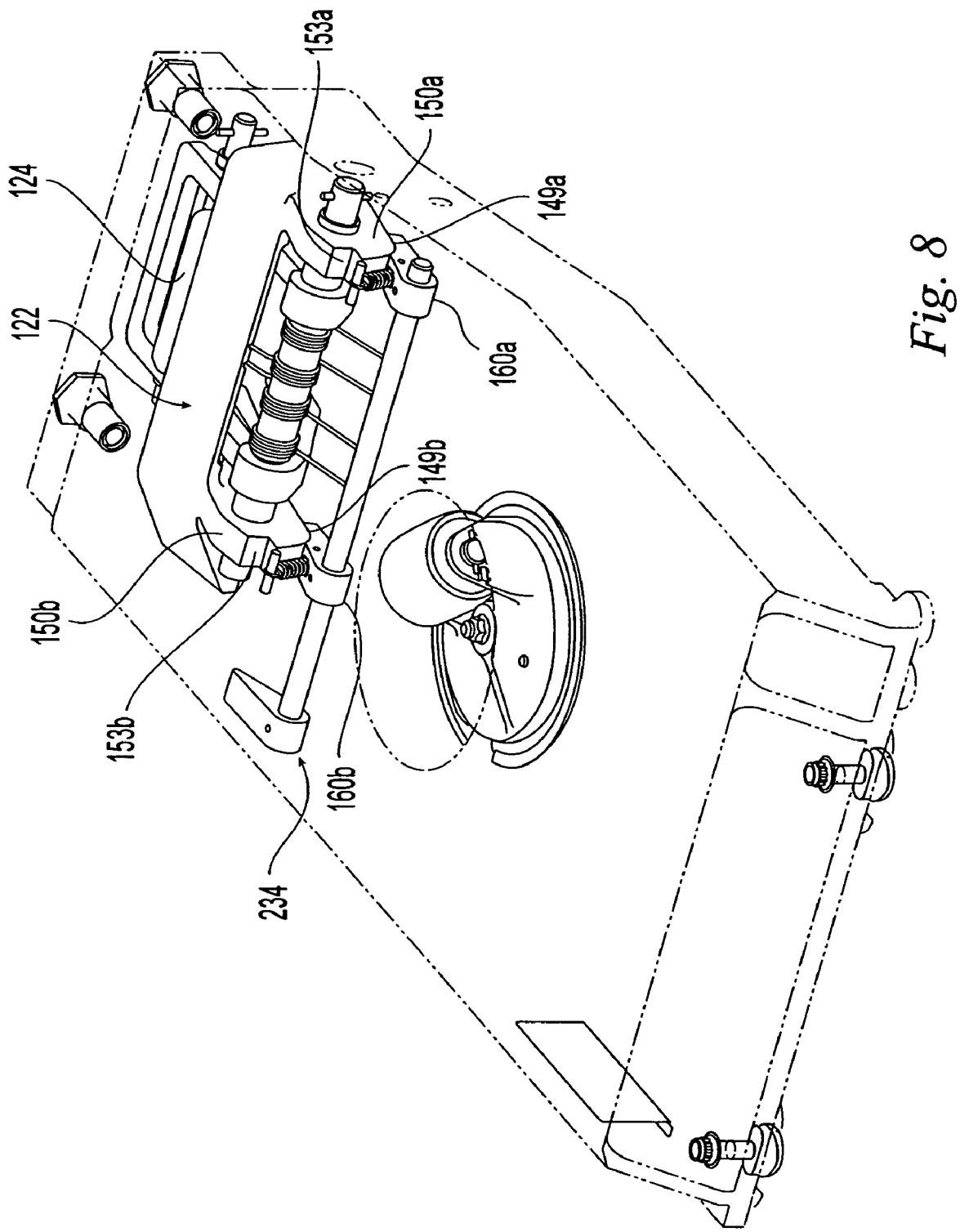
FIG. 8. shows a view of FIG. 7 with the base seen in phantom.
Figure 9:
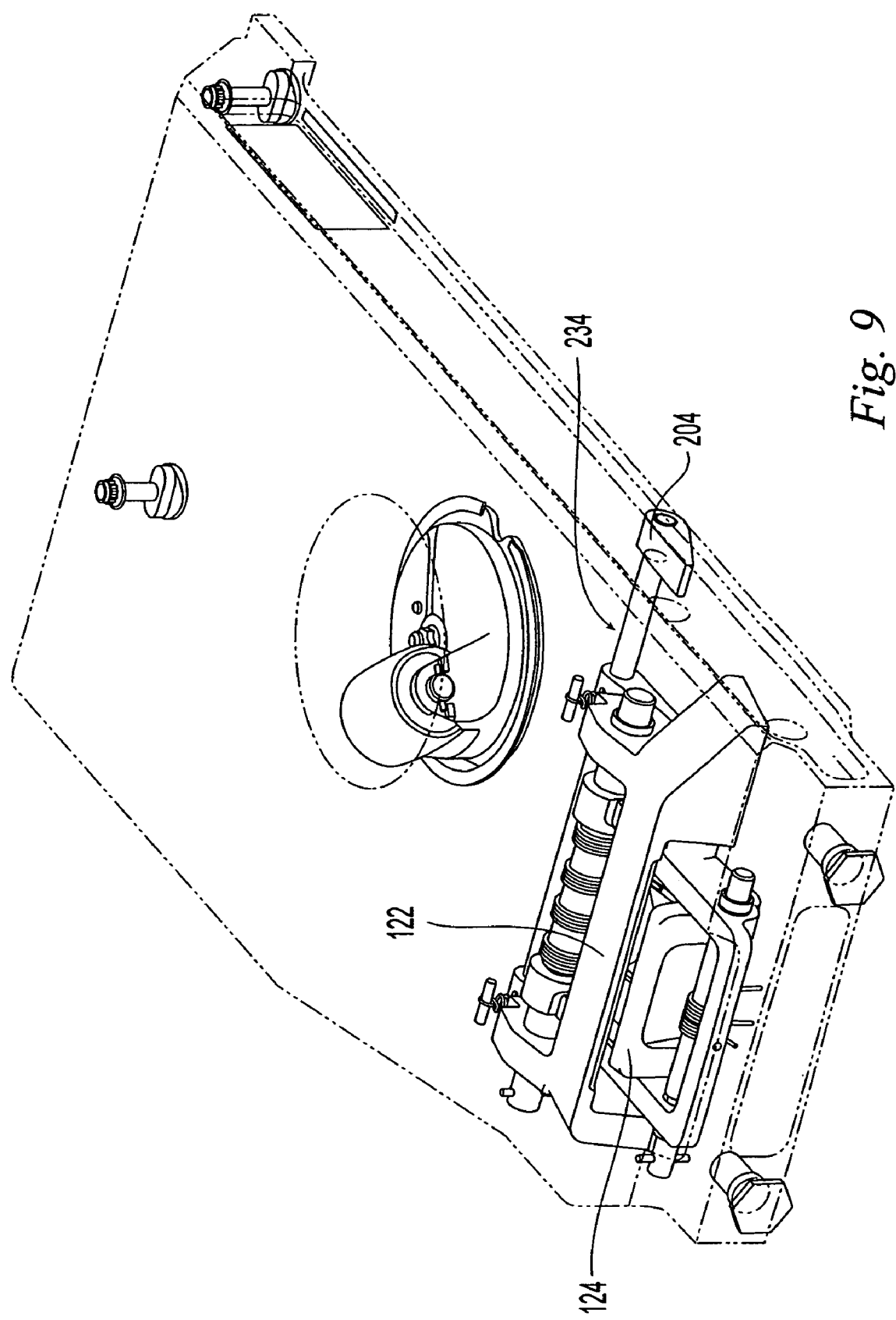
FIG. 9. shows a rear perspective view the guide/restraint of FIG. 7 with the base seen in phantom.

Operation of the guide/restraint 100 is explained next. FIG. 7 shows the guide/restraint 100 with both the guide 122 and the lockhead 124 in the retracted position. FIG. 8 shows a view similar to FIG. 7, but with the base shown in phantom. With the guide/restraint 100 deployed on a cargo deck and the guide 122 and the lockhead 124 both in the retracted position, an ULD may travel along a transport plane of the cargo deck, above the retracted guide 122 and lockhead 124. As best seen in FIG. 9, the guide 122 overlies the lockhead 124 when both are in the retracted position. Thus, the guide 122 must first be rotated to the upright position (FIG. 10 and FIG. 11) before the lockhead 124 can be rotated. In other words, the lockhead 124 can be rotated from the retracted position to the upright position only if the guide 122 is also rotated from the retracted position to the upright position at the same time, or, if the guide 122 is already in the upright position (FIG. 10 and FIG. 11).

As seen in FIGS. 8 and 13, when the guide 122 is in the retracted position, curved abutment surfaces 149A, 149B (FIG. 3C) formed on the back side of the guide legs 150A, 150B, respectively, abut and rest upon forward portions of the upwardly biased guide pawls 160A, 160B. As the guide 122 is manually rotated from the retracted position of FIGS. 8 and 13 to the upright position of FIGS. 10 and 14, the lower portion of the guide legs 150A, 150B rotate and the curved abutment surfaces 149A, 149B ride on forward portions of the guide pawls 160A, 160B until the ends of the upwardly biased guide pawls 160A, 160B are received into the forwardly facing cutouts 153A, 153B formed on the guide legs 150A, 150B. Thus, the guide 122 is locked in the upright position by a pair of spaced apart, upwardly biased, guide pawls 160A, 160B, fixedly mounted on the common guide pawl shaft 161.

Figure 10:
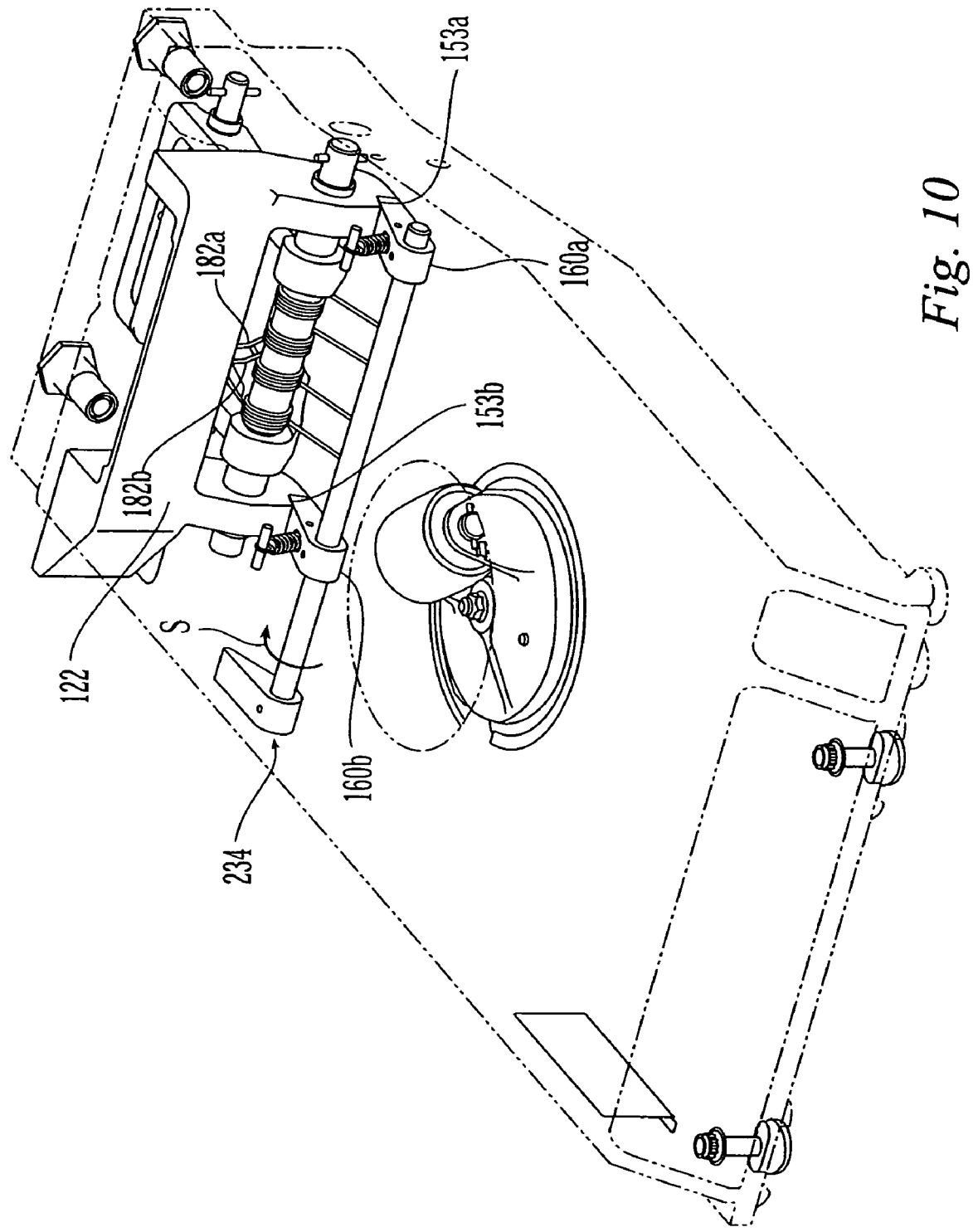
FIG. 10 shows a front perspective view of the embodiment of FIG. 1, with the guide in the upright position, the lockhead in the retracted position and the base in phantom.
Figure 11:
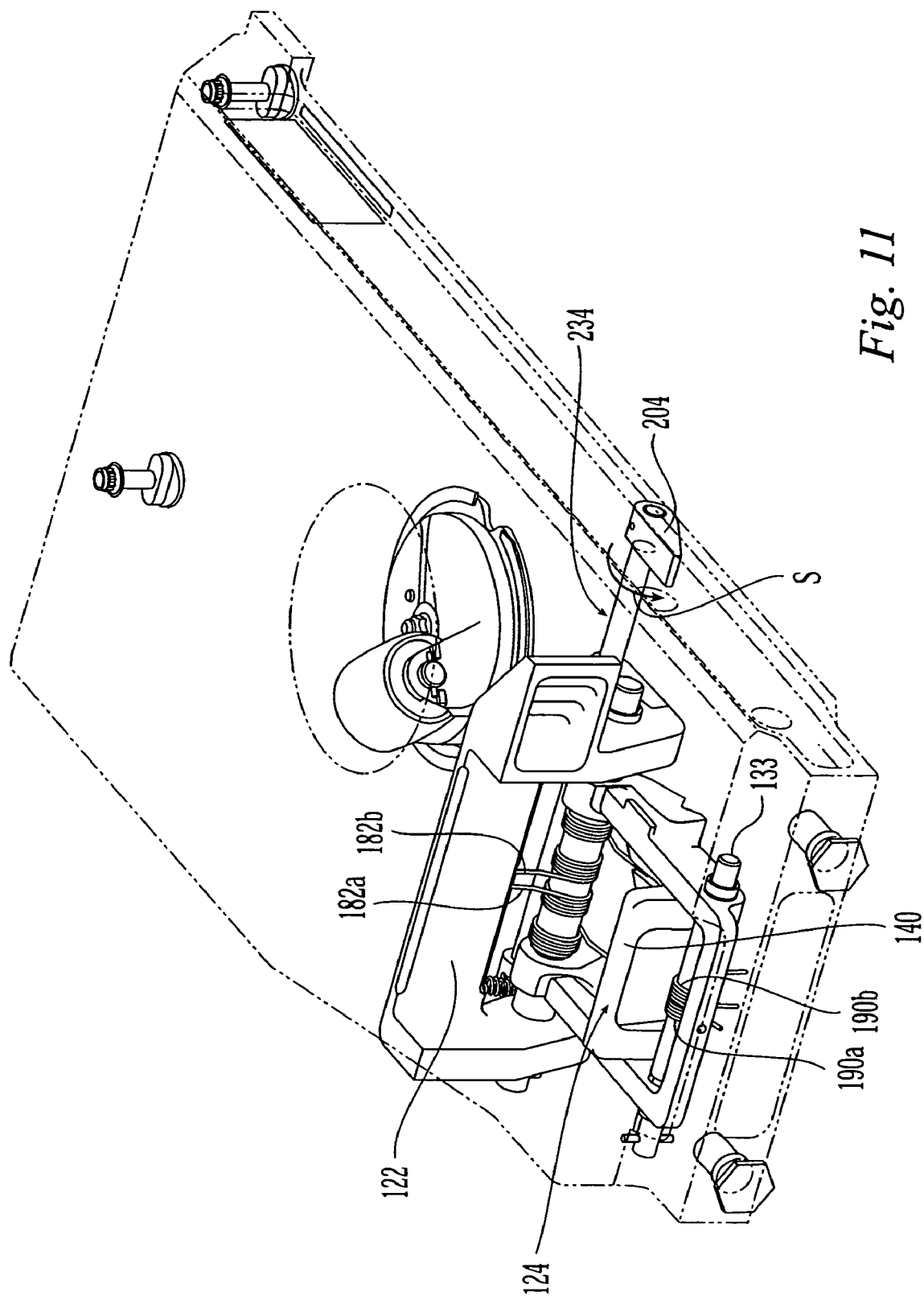
FIG. 11 shows a rear perspective view of FIG. 10

With reference to FIGS. 10 and 11, to return the guide 122 to the retracted position, an operator rotates the release handle 204 of the guide pawl shaft assembly 234 in the direction indicated by the rotational arrow S. This causes the ends of the guide pawls 160A, 160B to disengage from the forwardly facing cutouts 153A, 153B formed on the guide legs 150A, 150B, thereby releasing the guide 122. And since the guide 122 is biased towards the retracted position by the inner springs 182A, 182B, the released guide 122 snaps back to assume the retracted position of FIGS. 8 and 13.

Figure 12:
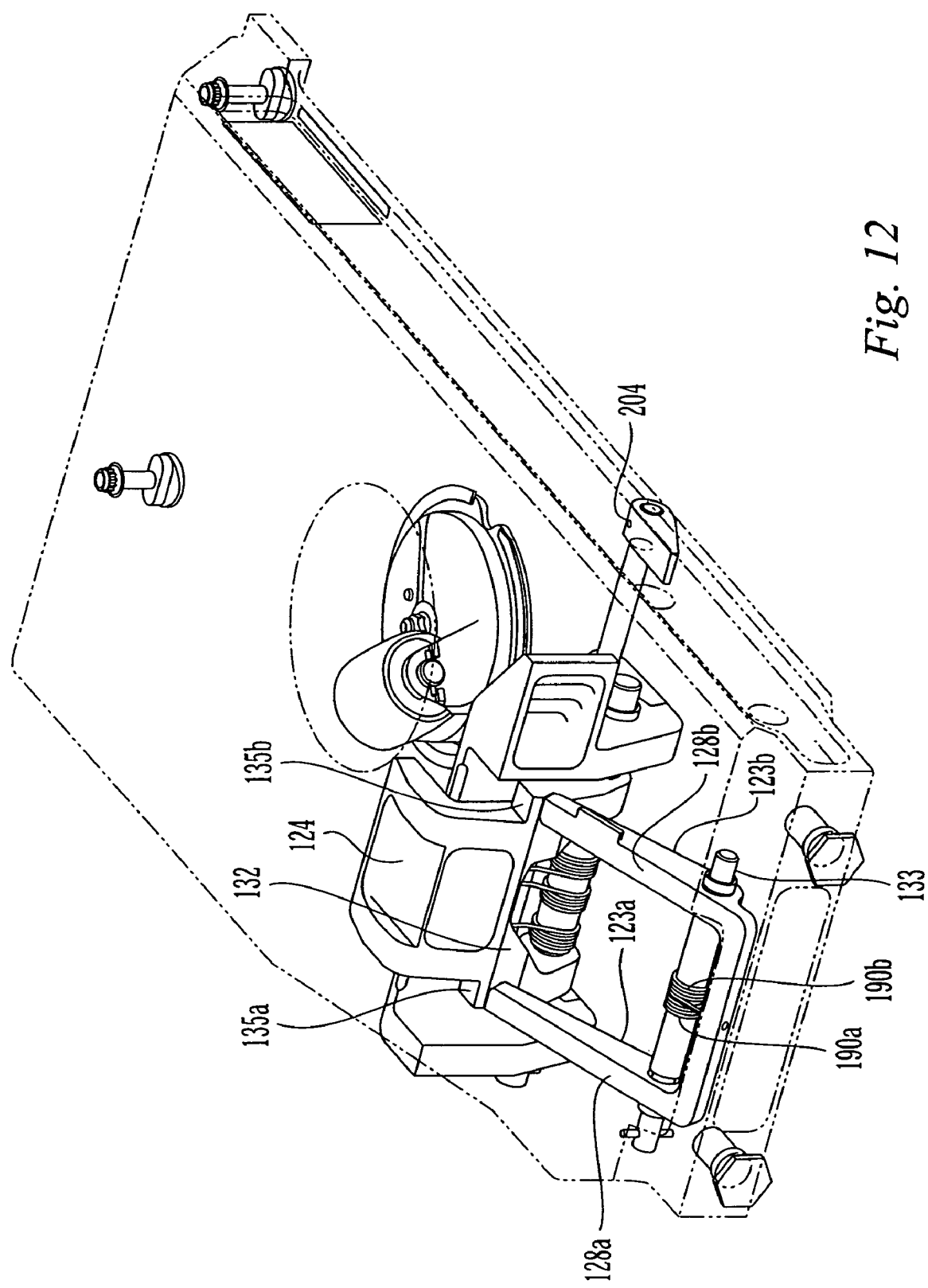
FIG. 12 shows a rear perspective view of the guide/restraint of FIG. 1 with the base seen in phantom, highlighting the operation of the lockhead pawl and lockhead.

With reference to FIGS. 3A, 3B, 11 and 12, the process for adjusting the lockhead 124 from the retracted position to the upright position is now explained. An operator grabs the lock 140 of the lockhead 124 and begins to rotate the lockhead 124 towards the upright position. As this happens, the shoulders 135A, 135B, and especially their beveled surfaces 141 (FIG. 3B) first abut the lower ramping surfaces 123A, 123B on the lockhead pawl's legs 128A, 128B, respectively. As the operator continues to rotate the lockhead 124, its shoulders 135A, 135B travel along the length of the lower ramping surfaces 123A, 123B, rotating the lockhead pawl 126 about its shaft 133 against the biasing force of springs 190A, 190B, and lifting its legs 128A, 128B. As the lockhead 124 is rotated into the fully upright position, the lockhead pawl's legs 128A, 128B slip off the shoulders 135A, 135B, and the end surfaces 130A, 130B fall into place against rearwardly facing surfaces 132 formed in a notch 134 of the lockhead 124. In this manner, the lockhead pawl 126 locks the lockhead 124 in the upright position, as seen in FIG. 12.

As seen in the figures, when both the guide 122 and the lockhead 124 are in the upright position, the lockhead 124 is taller than the guide 122 and the lockhead's lock 140 projects past the forwardmost point of the cross-member 152 of the guide 122 in the forward (or 'inboard') direction. This allows the lock 140 and/or its underside surface 140A to abut or otherwise engage a pocket or other structure formed on a pallet. So, even though the guide 122 is in the upright position, it does not interfere with using the lockhead 124 due to the construction of these two components and also because of their coaxial arrangement.

When both the lockhead 124 and the guide 122 are in the upright position, one must first return lockhead 124 to the retracted position; operating the release handle 204 with the lockhead 124 will not return the guide 122 to the retracted position. To return the lockhead 124 to the retracted position, an operator further rotates the lockhead pawl 126 by foot or by hand, perhaps at the flange 128C, so that the end surfaces 130A, 130B of the lockhead pawl 126 are lifted upwards past the notch 134. Since the outer springs 180A, 180B bias the lockhead 124 towards the retracted position, and the lockhead 124 is no longer supported by the end surfaces 130A, 130B due to the operator's action, the lockhead 124 snaps back into the retracted position, its lock 140 passing between the legs 128A, 128B of the lockhead pawl 126. After the lockhead 124 has been released, the operator then releases the lockhead pawl 126, allowing it to return to the retracted position by virtue of the biasing force of springs 190A, 190B. This results in the guide/restraint 100 being returned to the position seen in FIG. 7.

From the foregoing, it can be seen that when the lockhead 124 is down, the guide 122 is independently operable. Thus, with the lockhead 124 in a retracted position, the guide 122 may be brought to the upright position during loading of a cargo deck to provide guidance for various ULDs. Once a pallet has been loaded, the lockhead 124 may also be brought to an upright position to maintain the pallet in position during flight.

To unload a pallet, the lockheads 124 are first retracted so as to disengage from a pocket, or other structure, provided on the pallet. The guides 122, at least on a first side of the pallet, are then retracted to facilitate removal of the pallet from the cargo deck. In one embodiment, the guides 122 on the opposite side of the pallet may be left in the upright position to facilitate guidance of other ULDs which had been loaded on the cargo deck.

Figure 15A:
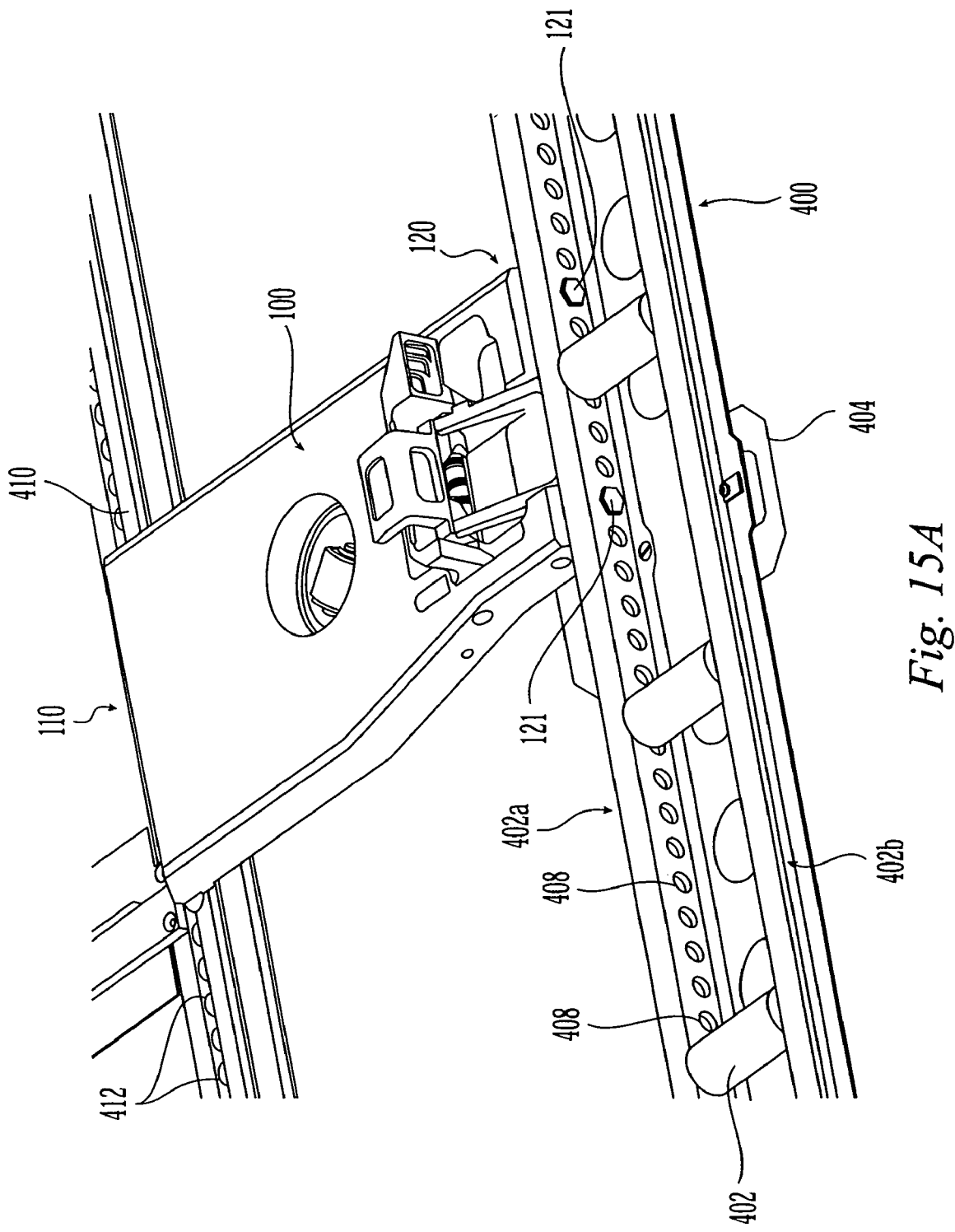
FIGS. 15A and 15B show two perspective views of a guide/restraint secured at one end to a lock tray and at opposite end to a seat track.
Figure 15B:
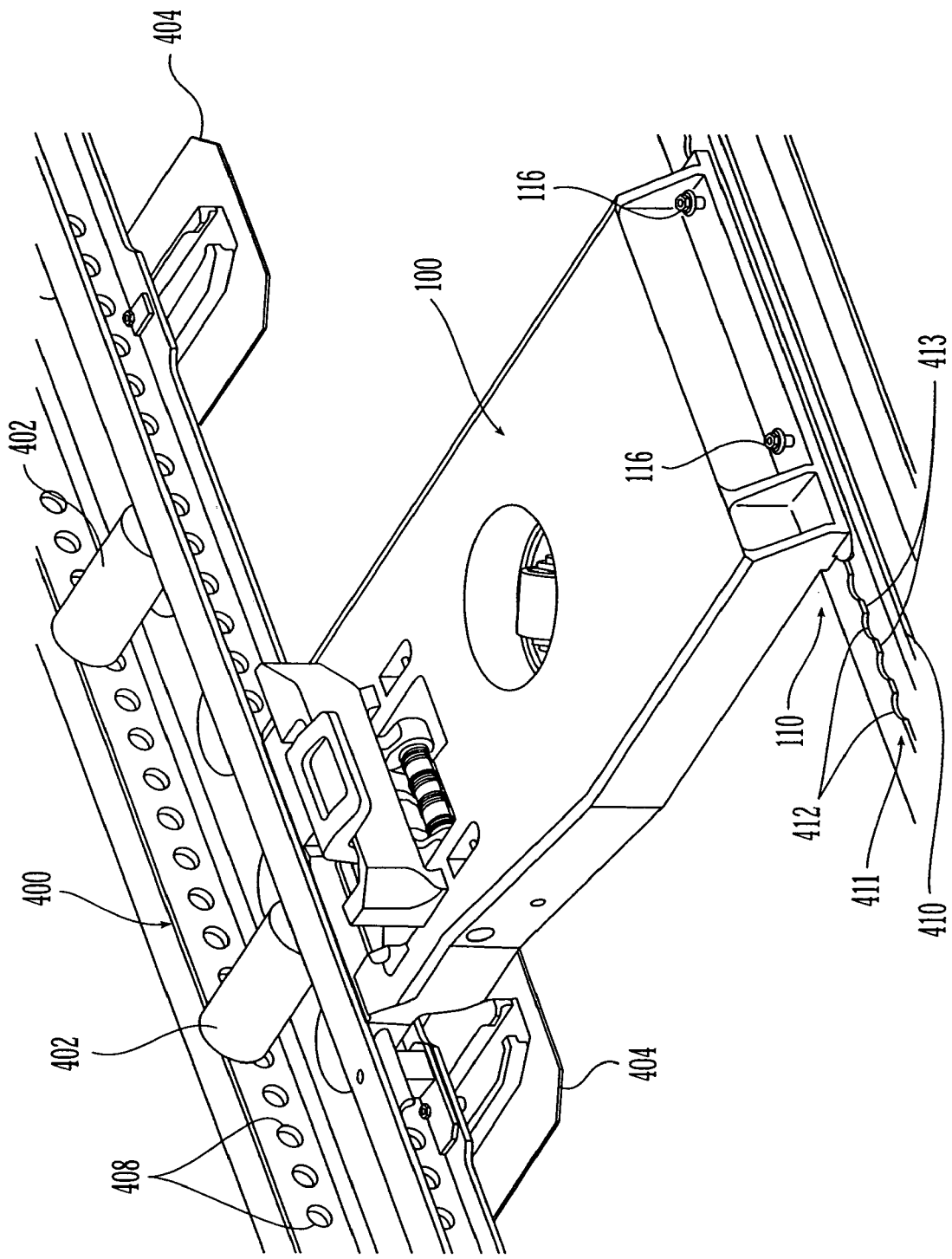

FIGS. 15A and 15B show a guide/restraint 100 secured at the first, or 'inboard' end 110 to a seat track 410 and at the second, or 'outboard' end 120 to a lock tray 400.

As seen in these figures, this particular lock tray 400 is mounted to an air cargo floor fixture 404. The lock tray 400 comprises a pair of parallel rails 402A, 402B. In one embodiment, each rail 402A, 402B is provided with a linear array of holes 408 spaced apart at one inch centers. Rollers 402 supported by these rails 402A, 402B are spaced apart along the length of the lock tray 400.

The outboard end 120 of the guide/restraint 100 is secured to the lock tray 400 by means of the shoulder bolts 121, which are screwed into openings 119 (FIG. 2) formed in the outboard end wall of the guide/restraint 110.

At its inboard end 110, the guide/restraint 100 is secured to the seat track 410 by means of the shear bosses 112 and tension studs 114 (FIG. 1) having tension stud nuts 116. As is known to those skilled in the art, the upper surface of each seat track 410 has a pair of opposing scalloped flanges 411 (only one of the pair being visible in FIG. 15B) forming a row of circular openings 412 connected by narrowed lips 413 (only one lip being visible in FIG. 15B). The tension studs 114 have an elongated lower portion 115 whose width is narrow enough to fit between the narrowed lips 413 of the opposing scalloped flanges 411. In one embodiment, installation is performed by first inserting the shear bosses 112 into the circular openings 412 while simultaneously inserting the lower portion 115 of the tension studs 114, with its long dimension parallel to the length of the seat track 410, between the narrowed lips 413 of the opposing scalloped flanges 411. Then, each tension stud 114 is rotated by a quarter turn, i.e., by 90°, so that the long dimension of its lower portion 115 is transverse to the length of the seat track 410. This results in the tension studs 114 being retained by the undersides of the opposing scalloped flanges 411 of the seat track 410.

It can thus be seen from FIGS. 1, 2, 15A and 15B, that while one end 110 of the guide/restraint 100 is provided with a first type of fixation device (e.g., tensions studs), the opposite second end 120 is provided with an altogether different type of fixation device (e.g., shoulder bolts). This arrangement allows a guide/restraint 100 to be positioned between dissimilar retaining devices, such as lock trays 400 and seat tracks 410, having completely different hardware for mating to a device such as the disclosed guide/restraint 100.

Figure 16:
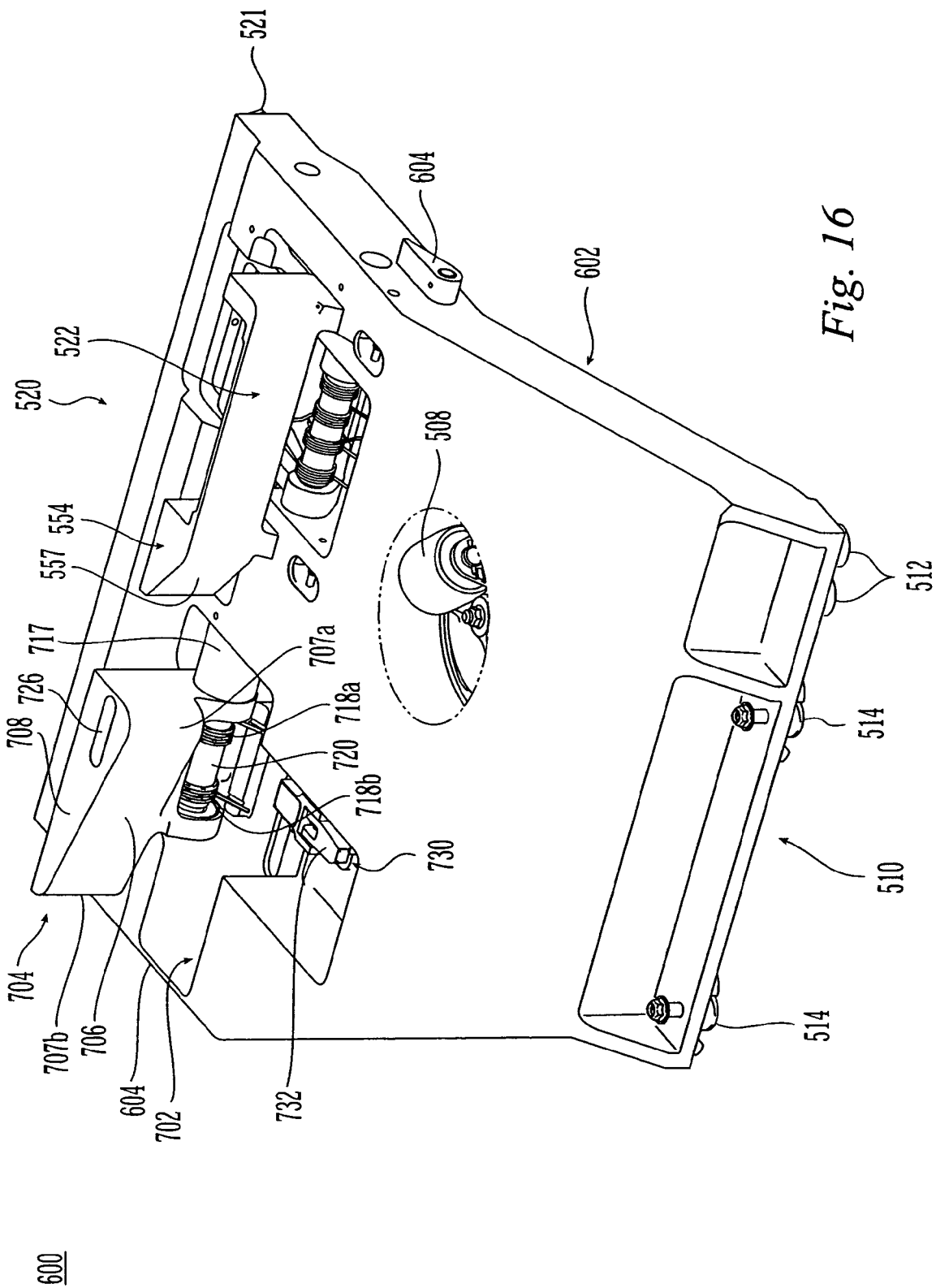
FIG. 16 shows a front perspective view of a second embodiment of a guide/restraint in accordance with the present invention, having an auxiliary guide in the upright position.

FIG. 16 shows a front perspective view of another guide/restraint 600, in accordance with one embodiment of the present invention.

The guide/restraint 600 has a base 602 supporting many of the same, or similar, components seen in the guide/restraint 100 described above. The common components include a caster 508, a guide 522 having a wedge-shaped guide head 554 provided with a rearwardly beveled front side 557, a lockhead 524, a lockhead pawl 526 and a release handle 604 for releasing the guide 522, all of whose operation is similar to that of their counterparts in FIGS. 1-14, described above.

In addition, for mating with other floor-mounted retaining devices, the base 602 is provided with shear bosses 512 and tension studs 514 on a first 'inboard' end 510, and is provided with shoulder bolts 521 on a second 'outboard' end 520. Much like the guide/restraint 100 described above, the shear bosses 512 and tension studs 514 are configured to connect to a seat track, such as seat track 410, while the shoulder bolts 521 are configured to connect to a lock tray, such as lock tray 400.

Figure 17:
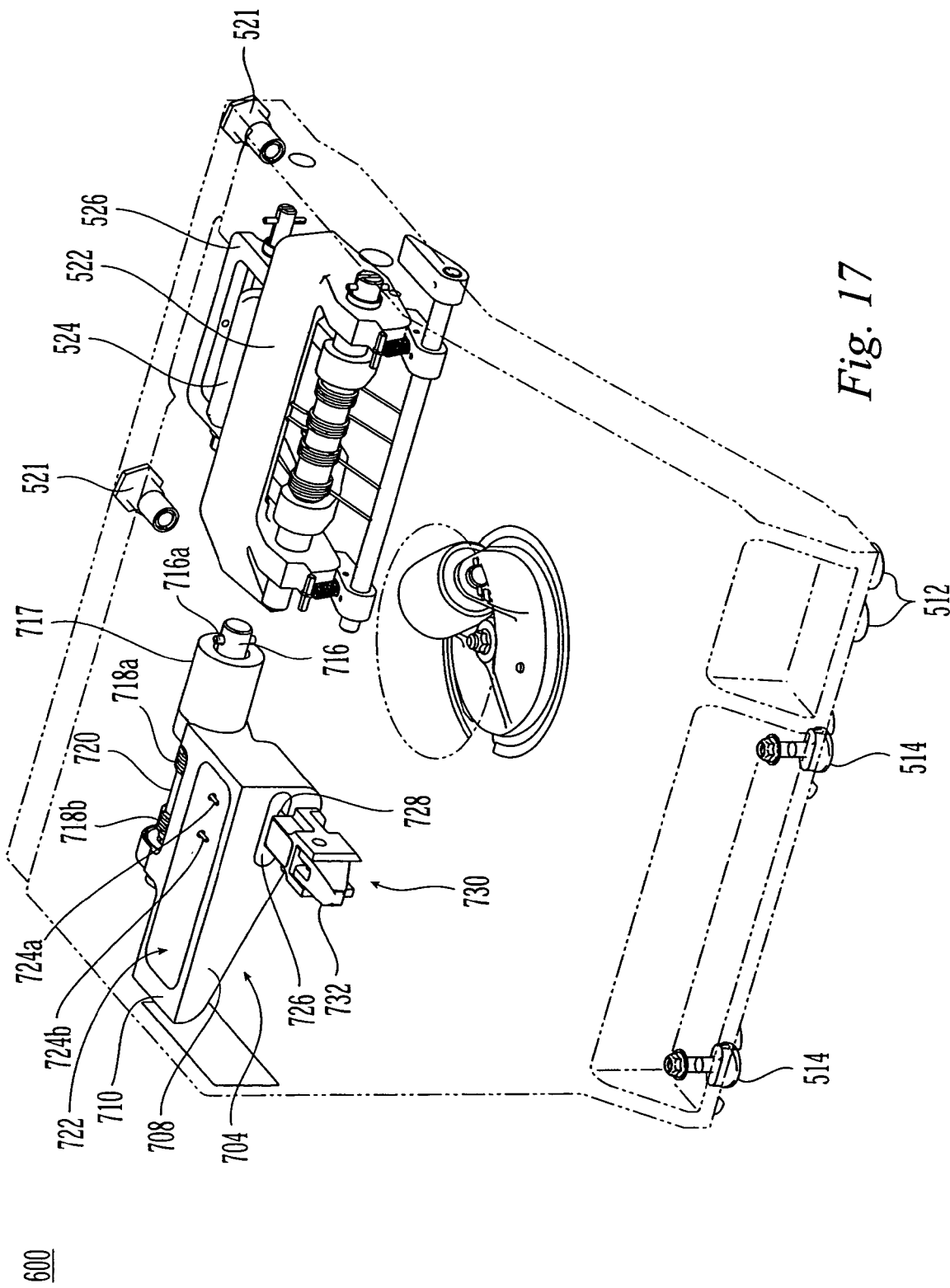
FIG. 17 shows a front perspective view of the guide/restraint of FIG. 16, with the base shown in phantom and the auxiliary guide in the retracted position.
Figure 18:
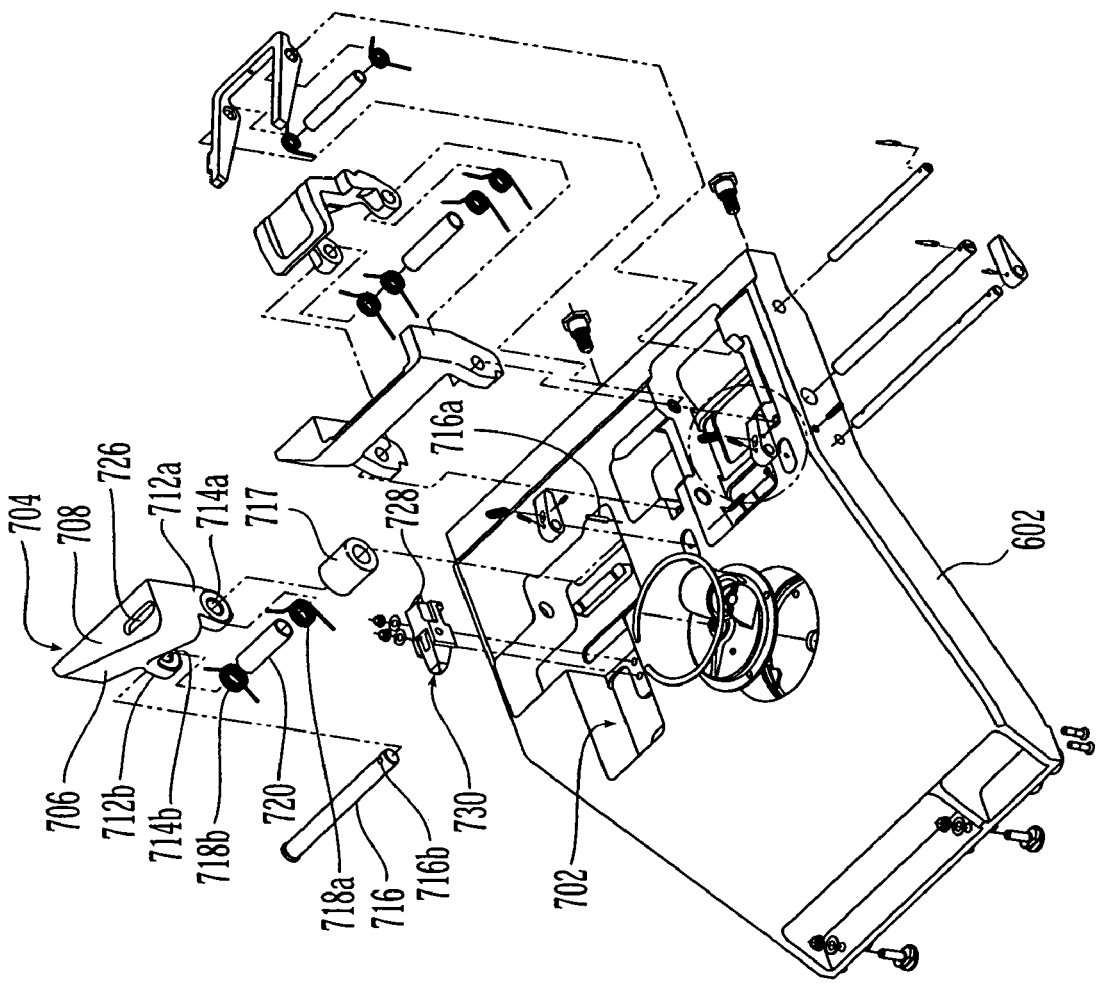
FIG. 18 shows an exploded view of the guide/restraint of FIG. 16.

As seen in FIG. 16 and FIG. 18, the guide/restraint 600 has an auxiliary recess 702. A wedge-shaped second, or 'auxiliary', guide 704 is mounted in this recess 702. The auxiliary guide 702 comprises an angled front surface 706, a generally triangular top surface 708, a back surface 710 (FIG. 17 and FIG. 19) and a pair of legs 712A, 712B having axially aligned openings 714A, 714B, respectively. With reference to FIG. 17 and FIG. 18, the auxiliary guide 702 is mounted on an auxiliary guide shaft 716 which passes through the axially aligned openings 714A, 714B in the legs 712A, 712B. The auxiliary guide shaft 716 is secured to the base 602 by a securing pin 716A inserted into an traverse aperture 716B formed at one end of the auxiliary guide shaft 716 (FIG. 17).

The auxiliary guide shaft 716 also passes through a spring 717 which is coaxially mounted with the auxiliary guide 704. The spring 717 spaces apart the auxiliary guide 704 from an interior side wall of the auxiliary recess 702. The spring 717 is configured to help mitigate a shock applied to the second guide; when the auxiliary guide is struck by an ULD that is being loaded onto a cargo deck, the spring 717 helps absorb the impact. In one embodiment, the spring 717 is formed from an elastic material, such as polyurethane. In other embodiments, the spring 717 may be a compression spring.

Figure 19:
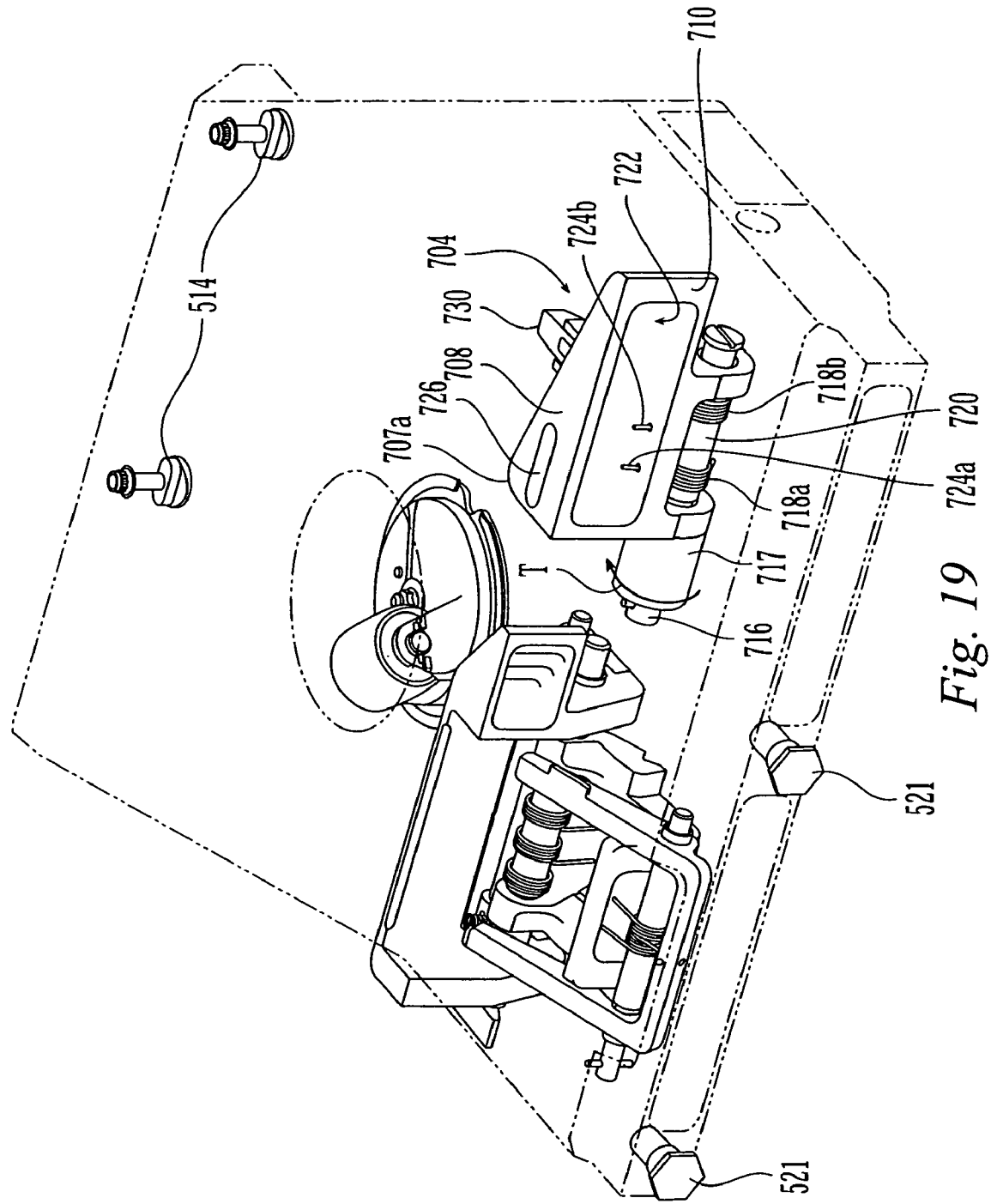
FIG. 19 shows a rear perspective view of the guide/restraint of FIG. 16, with the base shown in phantom and the auxiliary guide in the upright position.

The auxiliary guide 704 can occupy either an upright position (FIG. 16) or a retracted position (FIG. 17). A pair of torsion springs 718A, 718B are mounted on the auxiliary guide pin 716 between the legs 712A, 712B, via an auxiliary sleeve 720. The back surface 710 of the auxiliary guide 704 is provided with a recess 722 into which ends 724A, 724B of the auxiliary springs 718A, 718B, respectively, protrude (FIG. 17 and FIG. 19). The torsion springs 718A, 718B bias the auxiliary guide 704 into the upright position of FIG. 17.

The front surface 706 of the auxiliary guide 704 is rearwardly angled from a forwardmost point 707A near an inner portion of the base 602 to a rearwardmost point 707B proximate a base edge 604. Thus, the front surface 706 of the auxiliary guide 704 is angled in the same direction as the front side 557 of the wedge-shaped guide head 554 belonging to guide 522.

The top surface 708 of the auxiliary guide 704 is provided with a latch recess 726. The latch recess 726 is configured and dimensioned to receive the latch 728 of a release element 730 that is mounted in the floor of the auxiliary recess 702. When the auxiliary guide is in the upright position of FIG. 17 or FIG. 19, an operator may rotate the auxiliary guide 704, against the biasing force of the auxiliary springs 718A, 718B and in the direction indicated by rotational arrow T (FIG. 19), until the latch 728 is captured by the latch recess 726. When the auxiliary guide 704 is in the retracted position of FIG. 16 with the latch 728 captured in the latch recess 726, an operator may manually press the spring loaded latch release 732 to withdraw the latch 728 from the latch recess 726, and thereby allow the torsion springs 718A, 718B to return the auxiliary guide 704 to the upright position of FIG. 17.

The guide/restraint 600 is suitable for mounting near a doorway, such as a side doorway, of an air cargo main deck. The auxiliary guide 704, and especially the spring 717 adjacent thereto, helps protect the guide/restraint 600 from high impact loads that may result when an ULD being loaded is not aligned properly as it enters the cargo hold.

Figure 20:
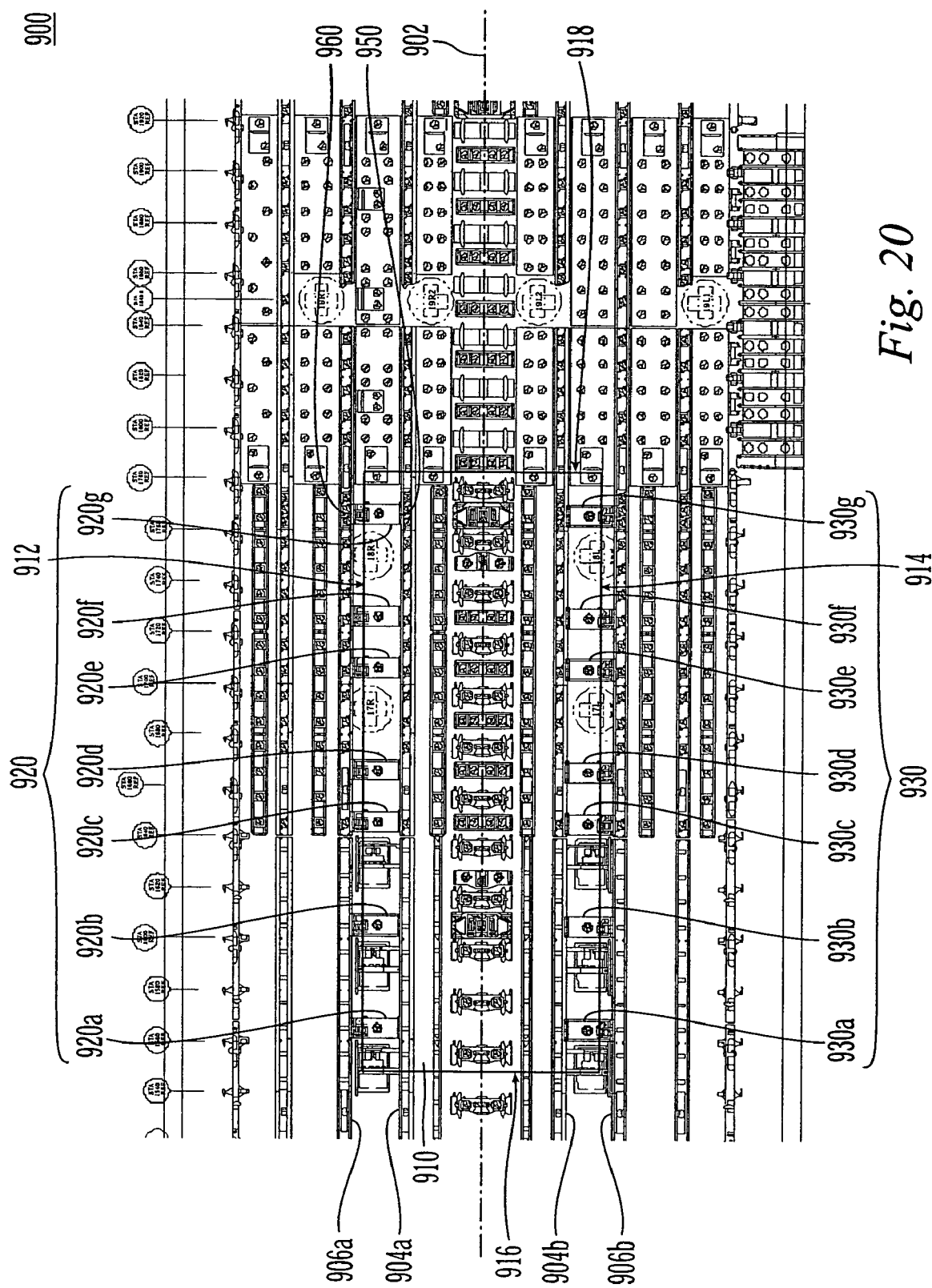
FIG. 20 shows a partial layout of an air cargo deck in which a pallet is loaded along the centerline and retained with guides/restraints in accordance with the present invention.

FIG. 20 shows a partial layout of a Boeing 747 main air cargo deck 900, depicting the centerline 902 of the cargo deck 900 and a 20 foot pallet 910 loaded along the centerline 902 and retained by a plurality of guides/restraints not unlike those seen in FIG. 1. In FIG. 20, the pallet 910 is shown as a rectangular outline defined by a pair of parallel long sides 912, 914, a forward end 916 and an aft end 918.

In one embodiment, the pallet 910 is mounted just aft of the wingbox area of the main cargo deck 900. The wingbox area is an area of the cargo deck 900 which corresponds to the locations on either side of the fuselage where the aircraft's wings are attached. Thus, the wingbox area extends for an axial length along the cargo deck that more or less corresponds to the width of the wings where they attach to the fuselage. In the wingbox area, beneath the cargo deck, are a plurality of spaced apart floor beams, or joists, which extend longitudinally, or lengthwise, along the fuselage. Outside the wingbox area are a plurality of spaced apart weight-bearing floor beams, or joists, which extend transversely, or widthwise, to the fuselage. Generally speaking, the floor beams outside the wingbox area are able to sustain greater loads than the floor beams inside the wingbox area, and so the pallet 910 is preferably loaded outside the wingbox area.

On either side of the centerline 902 are a pair of axially extending seat tracks 904A, 904B. It is understood, however, that additional seat tracks and lock trays, not relevant to the present discussion, may also be present on the cargo deck 900. In an outboard direction (i.e., in a direction away from the centerline 902 and towards the sides of the cargo compartment) from either seat track 904A, 904B is an axially extending roller tray 906A, 906B. The seat tracks 904A, 904B and the roller trays 906A, 906B are parallel to one another. Two parallel rows 920, 930 of guides/restraints extend parallel to, and on opposite sides of, the centerline 902. The guides/restraints connect the seat tracks 904A, 904B to corresponding roller trays 906A, 906B, respectively. In the embodiment shown, the first row 920 includes guides/restraints 920A, 920B, 920C, 920D, 920E, 920F, 920G, while the second row 930 includes guides/restraints 930A, 930B, 930C, 930D, 930E, 930F, 930G.

It is understood that the various guides/restraints 920A-G and 930A-G are similar in construction to guide/restraint 100 described above insofar that each has coaxially mounted guides 122 and lockheads 124 on the outboard end. However, the shape and position of the gussets 220 in each of these guides/restraints 920A-G and 930A-G may differ from one to another so as to properly direct vertical loads, via the shear bosses 112 (FIG. 1), directly into the aforementioned transversely extending, weight-bearing floor beams underlying the cargo deck 900 outside the wingbox area. Thus, in one embodiment, the guides/restraints 920A-G and 930A-G retaining the pallet 910 are mounted outside the wingbox area of the cargo deck 900.

As seen in FIG. 20, the first, or "inboard", ends 950 of these guides/restraints 920A-G and 930A-G connect to the seat tracks 904A, 904B, respectively, while their second, or "outboard", ends 960 connect to the lock trays 906A, 906B, respectively, in a manner described above. Thus, while one or more types of fixation devices connect the first end of the guides/restraints 920A-G and 930A-G to a first retaining device (e.g., either the seat track or the lock tray), different fixation devices connect the second end of the guides/restraints 920A-G and 930A-G to the second retaining device (e.g., the other of the seat track or the lock tray).

In the embodiment of FIG. 20, the 20 foot pallet 910 is retained along the centerline 902 by a plurality of guides/restraints 920A-G and 930A-G that connect at a first end to a seat track 904A, 904B and at a second end to lock trays 906A, 906B, each of the guides/restraints 920A-G and 930A-G having a coaxially mounted guide and lockhead, the guide configured to guide a passing ULD and the lockhead configured to help retain the ULD. The guides/restraints (920A-G and 930A-G are mounted in the cargo deck 900 such that the inboard end 950 of each guide/restraint is closer to the centerline 902 than the outboard end 960 of that guide/restraint. In addition, the inboard end 950 of each guide/restraint is attached to a seat track 904A, 904B, while the outboard end 960 of each guide/restraint is attached to a lock tray 906A, 906B.

While FIG. 20 shows a 20 foot pallet 910 loaded and retained along a centerline 902, it is understood that standard size pallets of other lengths, such as a standard 16 foot pallet or a standard 10 foot pallet may likewise be loaded along the centerline 902. For either a standard 16 foot pallet or a standard 10 foot pallet, a subset of the 14 guides/restraints 920A-G and 930A-G may be employed. For example, in one embodiment, to retain a standard 16 foot pallet along the centerline 902, only six guides/restraints from each row 920, 930, and in particular guides/restraints 920A-F and 930A-F may be used, guide/restraints 920G and 930G not being used. Similarly, to retain a standard 10 foot pallet along the centerline 902, only four guides/restraints from each row 920, 920, and in particular guides/restraints 920C-F and 930C-F may be used, guide/restraints 920A, 920B, 920A, 920G, 930A, 930B, 930G being idle. In some embodiments, especially for the shorter pallets, additional restraints may be used to engage the pallet's forward end 916 and/or aft end 918, to further secure the pallet.

In summary, then, the air cargo deck 900 has first and second rows 920, 930 extending parallel to, and on opposite sides of, the centerline 902. Each row 920, 930 comprises a plurality of guides/restraints 920A-G, 930A-G, respectively. In the embodiment shown, the guides/restraints are mounted in the cargo deck 900 such that the first end 950 of a guide/restraint is closer to the centerline 902 than the second end 960 of that guide/restraint, the first end 950 being attached to a seat track and the second end 960 being attached to a lock tray. Finally, these guides/restraints are mounted outside the wingbox area of the cargo deck 902 where transversely extending floor beams provide adequate support for the loads applied by pallets.

A method for loading a standard size pallet 910 along the centerline 902 of an air cargo deck 900 in accordance with one embodiment of the present invention begins with providing the first and second rows 920, 930 of the guides/restraints 920A-G, 920A-G on either side of the centerline 902, in the manner summarized above. Next, the standard size pallet 910 is positioned such that it straddles the centerline 902 with long sides 912, 914 of the pallet 910 overlying a portion of the base of at least some of the guides/restraints in each row 920, 930.

Finally, the lockheads of the guides/restraints over which the long sides 912, 914 of pallet 910 overlie must be rotated from the retracted position to the upright position, to thereby retain the standard size pallet 910 in position. It is understood that in some embodiments, the guides 122 of the guides/restraints that are being used in each row 920, 930 may also need to be rotated from the retracted position to the upright position, either prior to, or at the same time as, the lockheads 124. The pallet 910 may thus be restrained without the use of straps, thus saving time in loading and unloading the aircraft. Prior to loading the pallet 910 onto the cargo deck 900, an item of out-sized cargo (not shown) may be placed on pallet 910.

One may modify existing main cargo decks of certain Boeing 747 air cargo planes so that they can accommodate centerline loading of pallets, such as pallet 910, without the use of straps to tie down the pallet. The cargo decks on these certain planes are already equipped with first and second seat tracks 904A, 904B, respectively, extending parallel to the centerline 902 and positioned on either side thereof, and first and second lock trays 906A, 906B, respectively, extending parallel to the centerline 902 and positioned on either side thereof, each of the first and second lock trays 906A, 906B being spaced apart from a corresponding seat track 904A, 904B, respectively, and being farther from the centerline 902 than its corresponding seat track. Such a cargo deck may be modified by installing one row 920 comprising a first plurality of guides/restraints 920A-G between the first seat track 904A and the first lock tray 906A, and installing a second plurality of guides/restraints 930A-G between the second seat track 904B and the second lock tray 906B. Such a modification allows such a plane to carry standard size pallets that straddle the centerline, without the use of straps to tie down the pallet. As discussed above, in making these modifications, the guides/restraints would be installed outside the wing box area of the air cargo deck 900, and more particularly, aft of the wingbox area.

In the foregoing description, the pallet 910 is retained by the guides/restraints 920A-G, 920A-G without the use of straps. However, in some embodiments, straps may be used in addition to the guides/restraints of the present invention. This provides the necessary flexibility to accommodate unusual loads, non-standard pallets and other ULDs.

While the present invention has been described herein above in connection with a plurality of aspects and embodiments, it is understood that these aspects and embodiments were presented by way of example with no intention of limiting the invention. Accordingly, the present invention should not be limited to any specific embodiment or aspect, but rather construed in breadth and broad scope in accordance with the recitation of the claims appended hereto.

What is claimed is:

1. An air cargo transportation device comprising:
a base having a first end and a second end;
a first guide mounted to the base and rotatable between a retracted position and an upright position; and
a lockhead mounted to the base and rotatable between a retracted position and an upright position; wherein:
the first guide and the lockhead are separate members having dissimilar shapes and sharing a common axis of rotation around which each is rotatable relative to the base.

2. The air cargo transportation device according to claim 1, wherein, opposite ends of the base are provided with different types of fixation devices suitable for attaching to dissimilar retaining devices mounted on an air cargo deck.

3. The air cargo transportation device according to claim 1, wherein:

the first end of the base is provided with tension studs suitable for engaging a seat track; and
the second end of the base is provided with bolts for engaging a lock tray.

4. The air cargo transportation device according to claim 3, wherein:
the first end of the base is further provided with shear bosses shaped and sized to engage a seat track, the shear bosses being located outside a load span defined by the tension studs.

5. The air cargo transportation device according to claim 1, further comprising at least one caster mounted to the base.

6. The air cargo transportation device according to claim 1, wherein, when both the first guide and the lockhead are in their respective upright positions, the lockhead is taller than the first guide and projects in a first direction, past a forward-most point of the first guide in said first direction.

7. The air cargo transportation device according to claim 1, wherein, the first guide and the lockhead are coaxially mounted on a common shaft that is proximate the second end of the base.

8. The air cargo transportation device according to claim 1, wherein, when the lockhead is in the upright position, the lockhead is supported by a rotatably mounted pawl having a pair of spaced apart legs which abut the lockhead.

9. The air cargo transportation device according to claim 1, wherein, when the first guide is in the upright position, the first guide is locked in place by a pair of spaced apart, spring-biased pawls fixedly mounted on a shaft.

10. The air cargo transportation device according to claim 9, further comprising a release handle mounted on said shaft, operation of said release handle configured to return the first guide to the retracted position only when the lockhead is in the retracted position.

11. The air cargo transportation device according to claim 1, wherein the lockhead can be rotated from the retracted position to the upright position only:
(a) if the first guide is also rotated from the retracted position to the upright position at the same time; or
(b) if the first guide is already in the upright position.

12. The air cargo transportation device according to claim 1, further comprising a second guide mounted to the base and rotatable between a retracted position and an upright position, the first guide and second guide both being mounted proximate the second end of the base.

13. The air cargo transportation device according to claim 12, further comprising a spring coaxially mounted with the second guide, the spring configured to help mitigate a shock applied to the second guide.

14. An air cargo transportation device comprising:
a base having a first end and a second end,
the first end of the base being provided with tension studs suitable for engaging a seat track and also with shear bosses suitable for engaging a seat track, the shear bosses being located outside a load span defined by the tension studs;
the second end of the base being provided with bolts for engaging a lock tray;
at least one caster mounted to the base;
a lockhead mounted to the base, the lockhead being rotatable between a retracted position and an upright position; and
a first guide mounted to the base, the first guide being rotatable between a retracted position and an upright position;
wherein:

the first guide and the lockhead are coaxially mounted on a common shaft that is proximate the second end of the base;

when the lockhead is in the retracted position, the lockhead can be rotated from the retracted position to the upright position only:
 if the first guide is also rotated from the retracted position to the upright position at the same time, or
 if the first guide is already in the upright position;

when the lockhead is in the upright position, the lockhead is supported by a rotatably mounted pawl having a pair of spaced apart legs which abut the lockhead;

when the first guide is in the upright position, the first guide is locked in place by a pair of spaced apart guide pawls fixedly mounted on a shaft, said shaft on which said guide pawls are mounted having a release handle mounted thereon for returning the first guide to the retracted position;

when both the first guide and the lockhead are in their respective upright positions, the lockhead is taller than the first guide and projects in a first direction towards the first end of the base, past a forwardmost point of the first guide extending in said first direction.

15. The air cargo transportation device according to claim 14 further comprising a second guide mounted to the base and rotatable between a retracted position and an upright position, the second guide also being mounted proximate the second end of the base.

16. The air cargo transportation device according to claim 15, further comprising a spring coaxially mounted with the second guide, the spring configured to help mitigate a shock applied to the second guide.

17. An air cargo deck configured to retain a pallet along a centerline thereof, comprising:
 first and second rows of air cargo transportation devices mounted on the air cargo deck, the first and second rows extending parallel to, and on opposite sides of, said centerline, each row comprising a plurality of air cargo transportation devices, each air cargo transportation device comprising:
  a base having a first end and a second end;
  a first guide mounted to the base and rotatable between a retracted position and an upright position; and
  a lockhead mounted to the base and rotatable between a retracted position and an upright position; wherein:
   the first guide and the lockhead are separate members having dissimilar shapes and sharing a common axis of rotation around which each is rotatable relative to the base.

18. The air cargo deck according to claim 17, wherein:
 the air cargo transportation devices are mounted in the cargo deck such that the first end of each base is closer to the centerline than the second end of that base;
 the first end of each air cargo transportation device is attached to a seat track; and
 the second end of each air cargo transportation device is attached to a lock tray.

19. A method of loading a pallet along a centerline of an air cargo deck, the method comprising:
 providing first and second rows of air cargo transportation devices, the first and second rows extending parallel to, and on opposite sides of, said centerline, each row comprising a plurality of air cargo transportation devices, each air cargo transportation device comprising:
  a base having first and second ends;
  a first guide mounted to the base and rotatable between a retracted position and an upright position; and
  a lockhead mounted to the base and rotatable between a retracted position and an upright position; wherein:
   the first guide and the lockhead are separate members having dissimilar shapes and sharing a common axis of rotation around which each is rotatable relative to the base;
 positioning the pallet such that the pallet straddles the centerline with long sides of the pallet overlying a portion of the base of at least some of said air cargo transportation devices in each row; and
 rotating the lockheads of said at least some of said air cargo transportation devices in each row from the retracted position to the upright position, to thereby retain the pallet in position.

20. The method according to claim 19, comprising retaining the pallet without the use of straps.

21. The method according to claim 19, further comprising:
 rotating the guides of said at least some of said air cargo transportation devices in each row from the retracted position to the upright position, prior to, or at the same time as, rotating the lockheads.

22. The method according to claim 20, comprising placing out-sized cargo on the pallet, prior to positioning the pallet.

23. A method of converting an air cargo deck so that it can accommodate centerline loading of a pallet without the use of straps, the air cargo deck already having a centerline, first and second seat tracks extending parallel to the centerline and positioned on either side thereof; first and second lock trays extending parallel to the centerline and positioned on either side thereof, each of said first and second lock trays being spaced apart from a corresponding seat track and being farther from the centerline than said corresponding seat track, the method comprising:
 installing a first plurality of air cargo transportation devices between the first seat track and the first lock tray; and
 installing a second plurality of air cargo transportation devices between the second seat track and the second lock tray, wherein:
 each air cargo transportation device comprises:
  a base having first and second ends;
  a first guide mounted to the base and rotatable between a retracted position and an upright position; and
  a lockhead mounted to the base and rotatable between a retracted position and an upright position; wherein:
   the first guide and the lockhead are separate members having dissimilar shapes and sharing a common axis of rotation around which each is rotatable relative to the base; and
 the first end of each base is attached to a seat track and the second end of each base is attached to a lock tray.

* * * * *